US012591168B2

(12) United States Patent
Feng et al.

(10) Patent No.: US 12,591,168 B2
(45) Date of Patent: Mar. 31, 2026

(54) DISASSEMBLY AND ASSEMBLY COMPONENT AND ELECTRONIC DEVICE KIT

(71) Applicant: TILTA INC., Burbank, CA (US)

(72) Inventors: Zhichao Feng, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 333 days.

(21) Appl. No.: 18/418,844

(22) Filed: Jan. 22, 2024

(65) Prior Publication Data

US 2025/0180970 A1 Jun. 5, 2025

(30) Foreign Application Priority Data

Dec. 5, 2023 (CN) .......................... 202323326640.5

(51) Int. Cl.
*G03B 17/56* (2021.01)
*G06F 1/16* (2006.01)

(52) U.S. Cl.
CPC ......... *G03B 17/566* (2013.01); *G06F 1/1629* (2025.01)

(58) Field of Classification Search
CPC ...... F16M 11/041; H04M 1/04; H04M 1/026; H04M 1/0264; H04M 1/0252; H04M 1/0206; H04M 1/0203; G03B 17/566; G06F 1/1629
See application file for complete search history.

(56) References Cited

FOREIGN PATENT DOCUMENTS

| CN | 105933472 A | * | 9/2016 | .......... H04M 1/0264 |
| CN | 208862924 U | * | 5/2019 | |
| CN | 214037526 U | * | 8/2021 | |
| CN | 217583756 U | * | 10/2022 | |

* cited by examiner

*Primary Examiner* — Curtis A Kuntz

(74) *Attorney, Agent, or Firm* — LOZA & LOZA, LLP; Derek W. Yeung

(57) ABSTRACT

The present disclosure provides a disassembly and assembly component and an electronic device kit. including an installation base, a clamping unit, and a triggering unit. The clamping unit comprises includes a first clamping unit and a second clamping unit, while the triggering unit comprises a first triggering part and a second triggering part. When the triggering unit is actuated, the first triggering part and the second triggering part move in the first direction, driving the first clamping unit and the second clamping unit to approach or move away from each other. Upon releasing the triggering unit, the first clamping unit and the second clamping unit reset, and the triggering unit moves in the second direction. Through the mutual approach or separation of the first clamping unit and the second clamping unit, convenient and quick clamping or releasing of the shell component is achieved.

15 Claims, 20 Drawing Sheets

A-A

2221

2211

DISASSEMBLY AND ASSEMBLY COMPONENT AND ELECTRONIC DEVICE KIT

CROSS-REFERENCE TO RELATED APPLICATIONS

The present application for patent claims priority to and the benefit of pending Chinese Application No. 2023233266405, filed Dec. 5, 2023, and hereby expressly incorporated by reference herein as if fully set forth below in its entirety and for all applicable purposes.

TECHNICAL FIELD

The present disclosure relates to the technical field of electronic device accessories, more specifically, it involves disassembly and assembly components and electronic device kits.

INTRODUCTION

With the widespread use of photography and videography in people's lives, an increasing number of individuals engage in daily photography. There is a growing demand for enhanced photographic and video capabilities in electronic devices. Currently available electronic devices on the market have increasingly optimized photographic functions. However, these devices typically meet only the general photography requirements of users, and their capabilities are relatively limited. When users want to use additional accessories, it becomes challenging to fulfill more diverse photography requirements.

BRIEF SUMMARY

The present disclosure discloses disassembly and assembly components and an electronic device kit, enabling the installation of photography accessories through the disassembly and assembly components to enhance the functionality of electronic devices, meeting a broader range of photographic requirements.

Regarding the first aspect, the present disclosure provides a disassembly and assembly component, wherein comprising:

an installation base;

a clamping unit, wherein the clamping unit is movably arranged within the installation base, and including a first clamping unit and a second clamping unit, which are oppositely arranged in the installation base and are used for clamping or releasing a shell component;

a triggering unit, wherein the triggering unit is movably arranged within the installation base and includes a first triggering part abutting the first clamping unit and a second triggering part abutting the second clamping unit.

wherein in response to actuating the triggering unit, the first triggering part and the second triggering part are configured to move in a first direction, driving the first clamping unit and the second clamping unit to approach or move away from each other, wherein in response to releasing the triggering unit, the first clamping unit and the second clamping unit are configured to reset, and the triggering unit moves in a second direction;

the first direction and the second direction are opposite.

In one embodiment, a protruding end of the first clamping unit from the installation base has a first clamping part, and a protruding end of the second clamping unit from the installation base has a second clamping part. The first clamping part and the second clamping part are arranged opposite or facing away from each other.

In one embodiment, the first clamping unit has a first abutting surface, the first triggering part abuts the first abutting surface, and can move on the first abutting surface. The second clamping unit has a second abutting surface, the second triggering part abuts the second abutting surface, and can move on the second abutting surface.

In one embodiment, the first abutting surface and the second abutting surface are arranged on the same side of the first clamping unit and the second clamping unit;

alternatively, the first abutting surface and the second abutting surface are arranged on opposite sides of the first clamping unit and the second clamping unit.

In one embodiment, the installation base is provided with at least a first limiting groove, a second limiting groove, and a third limiting groove. The third limiting groove is at least partially connected to the first limiting groove and the second limiting groove. The first clamping unit is movably arranged in the first limiting groove, the second clamping unit is movably arranged in the second limiting groove, and the triggering unit is movably arranged in the third limiting groove. The first triggering part protrudes from the third limiting groove and abuts the first abutting surface, and the second triggering part protrudes from the third limiting groove and abuts the second abutting surface.

The first limiting groove's wall and the first clamping unit are provided with a first elastic member, and the second limiting groove's wall and the second clamping unit are provided with a second elastic member.

In one embodiment, the installation base has limiting pillars. The triggering unit also includes a connecting part, with the two ends of the connecting part connected to the first triggering part and the second triggering part, respectively. The connecting part is equipped with a limiting hole. The limiting pillars are movably arranged within the limiting hole;

alternatively, the first triggering part and the second triggering part have limiting pillars, and the installation base has a limiting part with limiting grooves opened at both ends. The limiting pillars are movably arranged within the limiting grooves.

In one embodiment, the triggering units comprises a plurality of triggering units, the first clamping unit has a plurality of first abutting surfaces, and the second clamping unit has a plurality of second abutting surfaces. The plurality of triggering units are all movably arranged within the installation base, and the first triggering part of each triggering unit corresponds one-to-one with the first abutting surface, and the second triggering part of each triggering unit corresponds one-to-one with the second abutting surface.

In one embodiment, further comprising an elastic body, which is positioned between the connecting part and an inner wall of the installation base or positioned between relatively arranged two triggering units of the plurality of triggering units.

In one embodiment, the installation base includes a first end and a second end arranged opposite each other, with parts of the first clamping unit and the second clamping unit extending from the second end. The second end is equipped with a locating pillar and/or an electronic probe, with the electronic probe capable of contacting an electronic contact of the shell component for circuit connection.

Regarding the second aspect, the present disclosure provides an electronic device kit, comprising:

a shell component with a containment cavity for accommodating electronic devices;

a plurality of disassembly and assembly components as described above, the disassembly and assembly components being detachably mounted on the shell component for installing photography accessories on the shell component.

In one embodiment, a protruding end of the first clamping unit from the installation base has a first clamping part, and a protruding end of the second clamping unit from the installation base has a second clamping part. An outer wall of the shell component is provided with at least one a first mounting hole and a second mounting hole. The first clamping part is engaged in the first mounting hole, and the second clamping part is engaged in the second mounting hole to secure the disassembly and assembly component to the shell component.

In one embodiment, the installation base includes ta first end and a second end arranged opposite to each other, with a least a portion of the first clamping unit and the second clamping unit extending from the second end. The second end is equipped with multiple locating pillars. The shell component has several locating holes for installing the locating pillar.

In one embodiment, one of the locating holes is communicatively connected to one of the first mounting holes, and the other locating hole is communicatively connected to one of the second mounting holes.

The disassembly and assembly component in the above embodiment includes an installation base, a clamping unit, and a triggering unit. The clamping unit comprises the relatively arranged first clamping unit and second clamping unit, while the triggering unit comprises the first triggering part and the second triggering part. When the triggering unit is actuated, the first triggering part and the second triggering part move in the first direction, driving the first clamping unit and the second clamping unit to approach or move away from each other. Upon releasing the triggering unit, the first clamping unit and the second clamping unit reset, and the triggering unit moves in the second direction. Convenient and quick clamping or releasing of the shell component is achieved this way. This facilitates the rapid installation of the disassembly and assembly component and the shell component, enhancing the convenience of attaching photography accessories and increasing the functionality of electronic devices.

In the electronic device kit using the disassembly and assembly component in the above embodiments, configuring the disassembly and assembly component and the shell component allows the shell component to accommodate electronic devices. The disassembly and assembly component allows the installation of photography accessories on the shell component. Under the action of the triggering unit, the disassembly and assembly component can be released from the shell component, facilitating the disassembly and assembly of the disassembly and assembly component. Additionally, as the disassembly and assembly component enables the installation of photography accessories, the rapid installation of electronic devices and photography accessories is facilitated, increasing the convenience of photography and the functionality of electronic devices.

Figure 1:
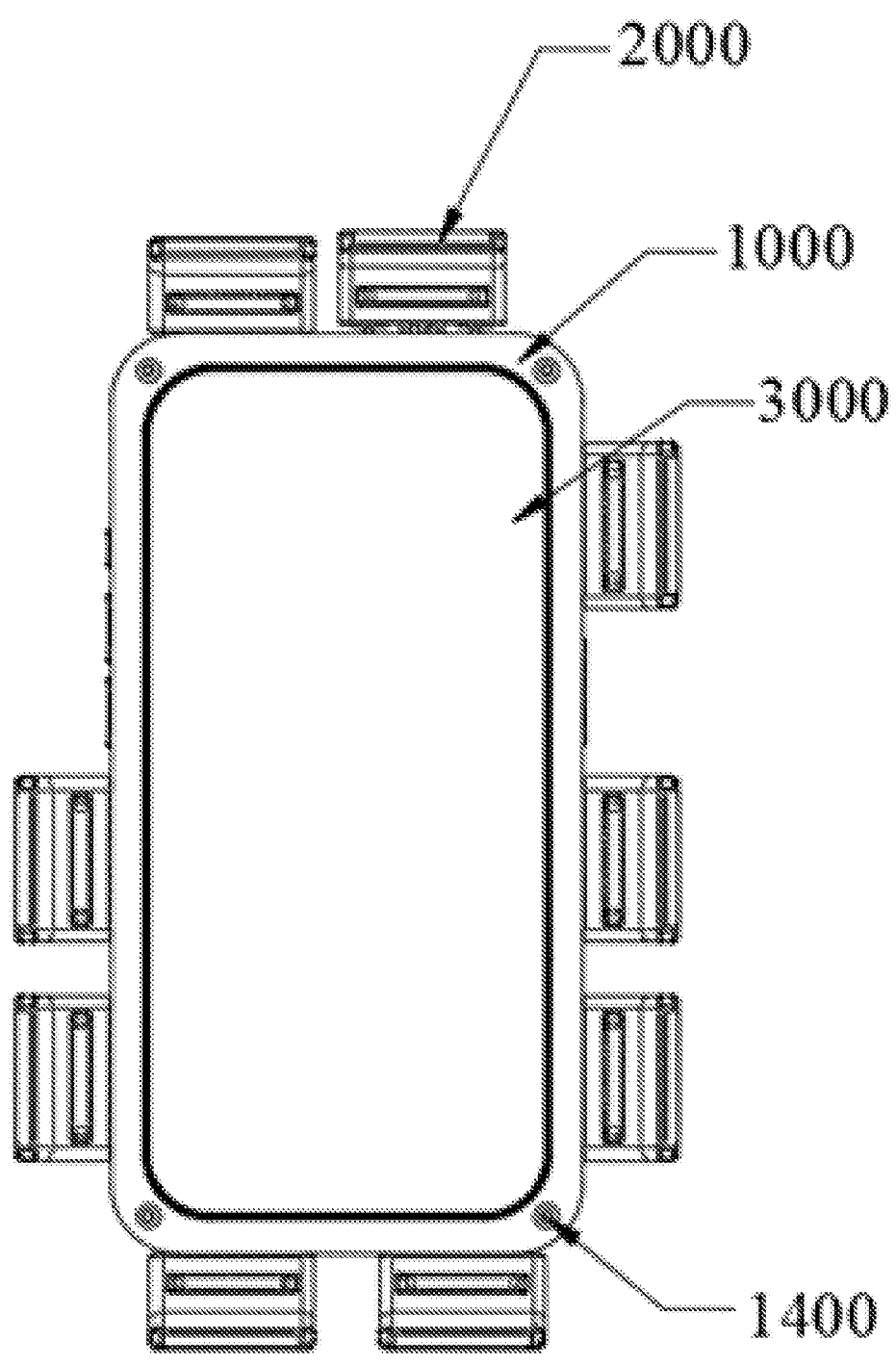
FIG. 1 is a front view of the structure of an electronic device kit applying the disassembly and assembly component in one embodiment.
Figure 2:
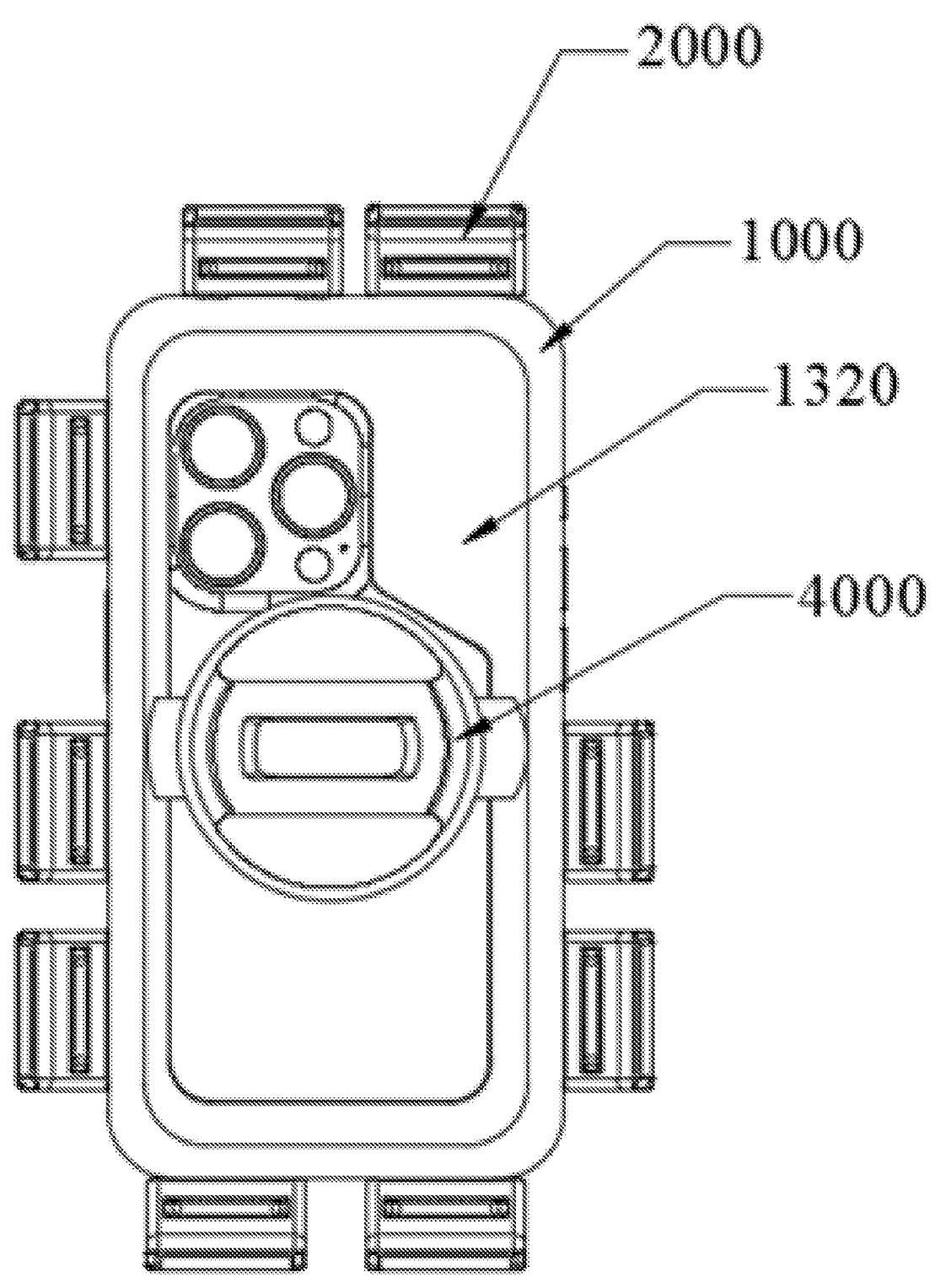
FIG. 2 is a rear view of the structure of an electronic device kit applying the disassembly and assembly component in one embodiment.
Figure 3:
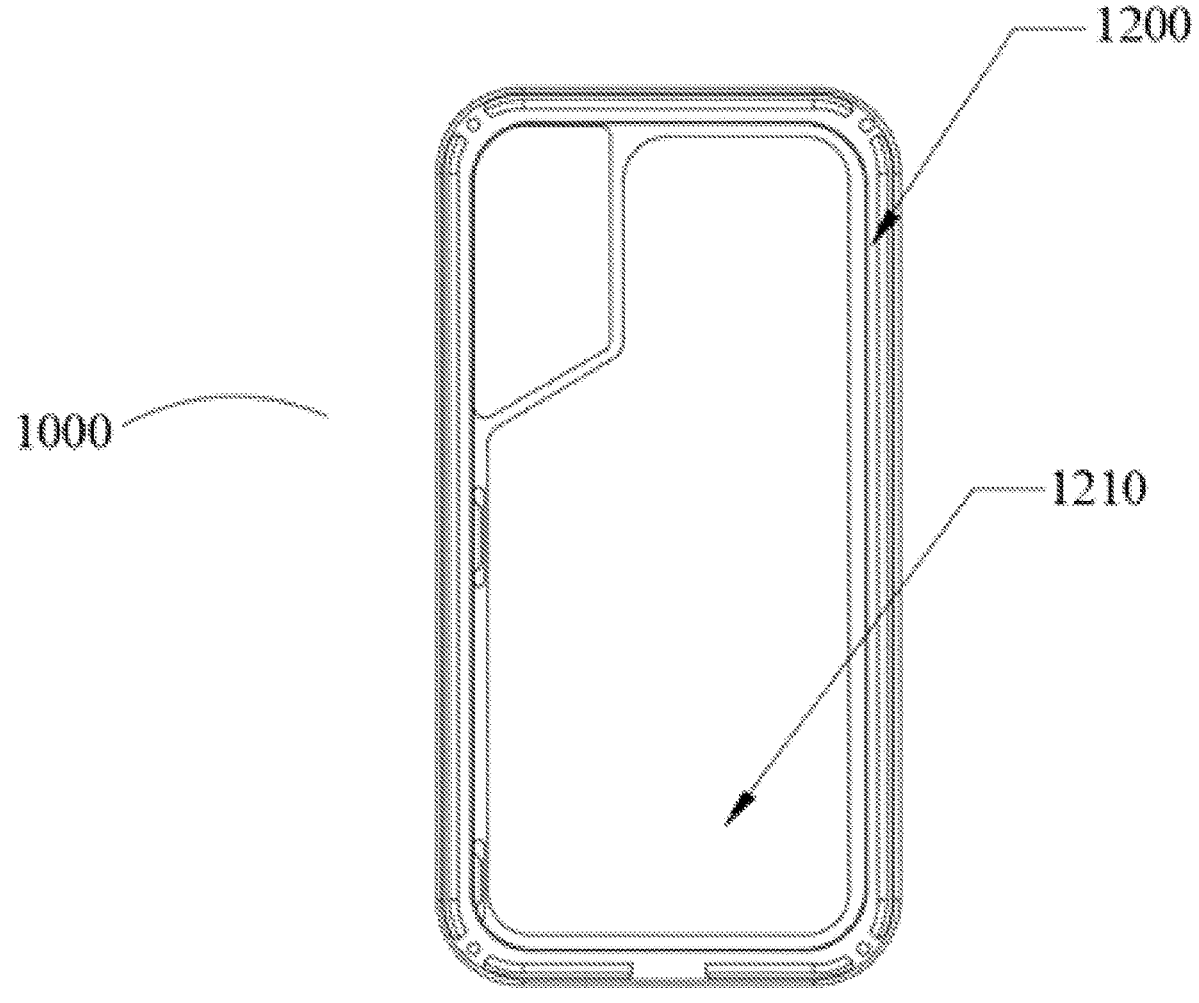
FIG. 3 is a front view of the structure of a shell component in one embodiment.
Figure 4:
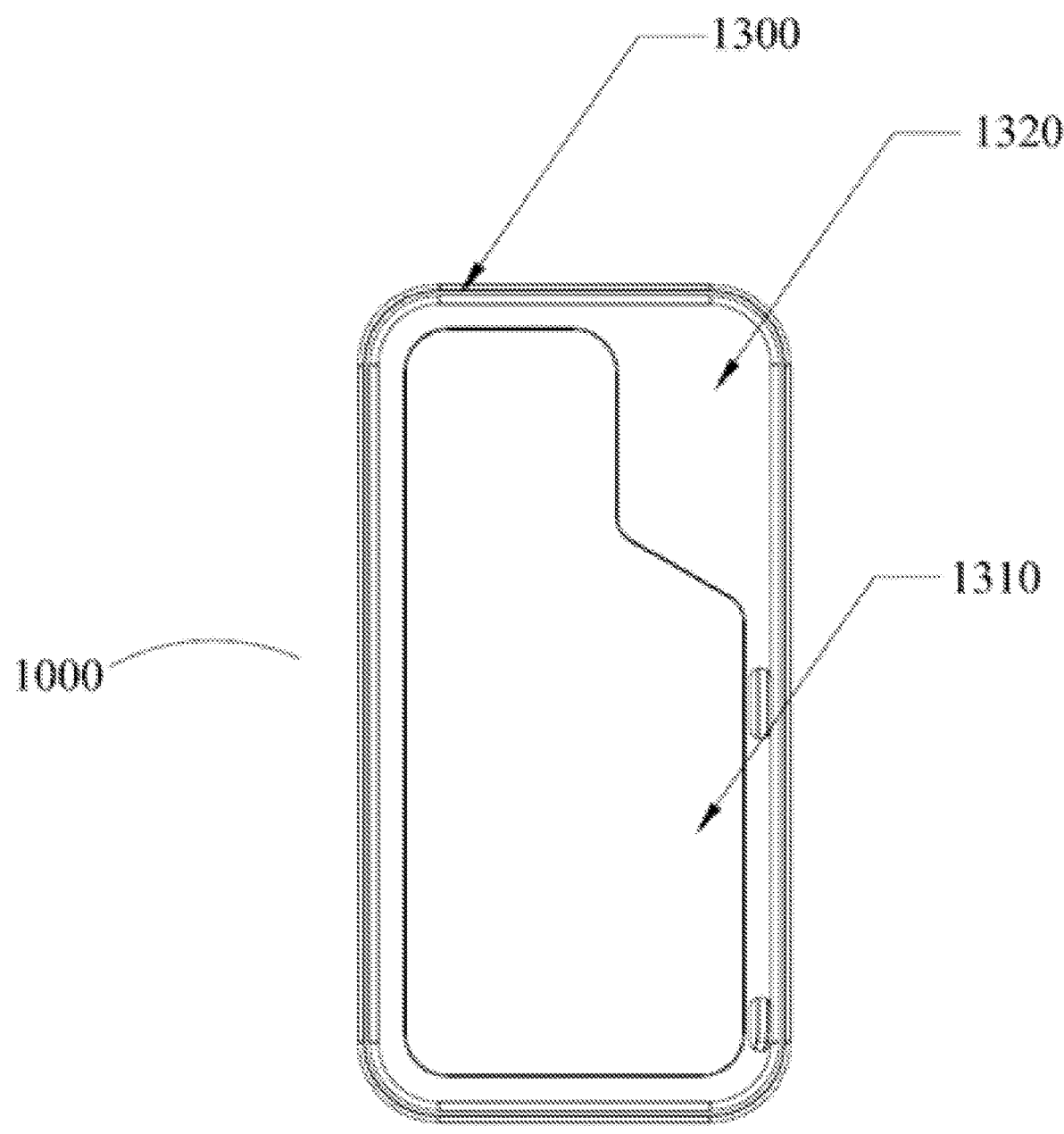
FIG. 4 is a rear view of the structure of a shell component in one embodiment.
Figure 5:
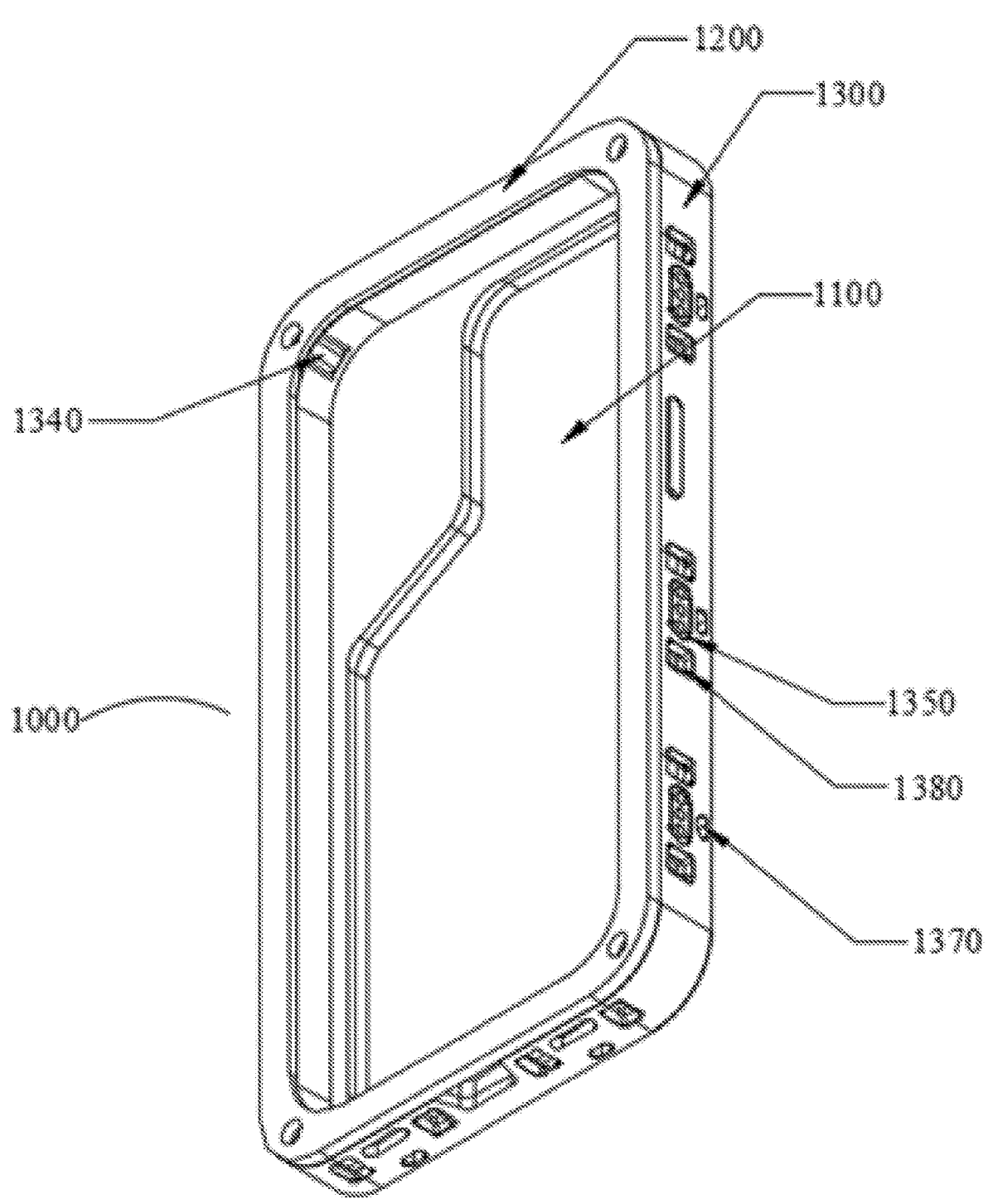
FIG. 5 is a perspective view of the structure of a shell component in one embodiment.
Figure 6:
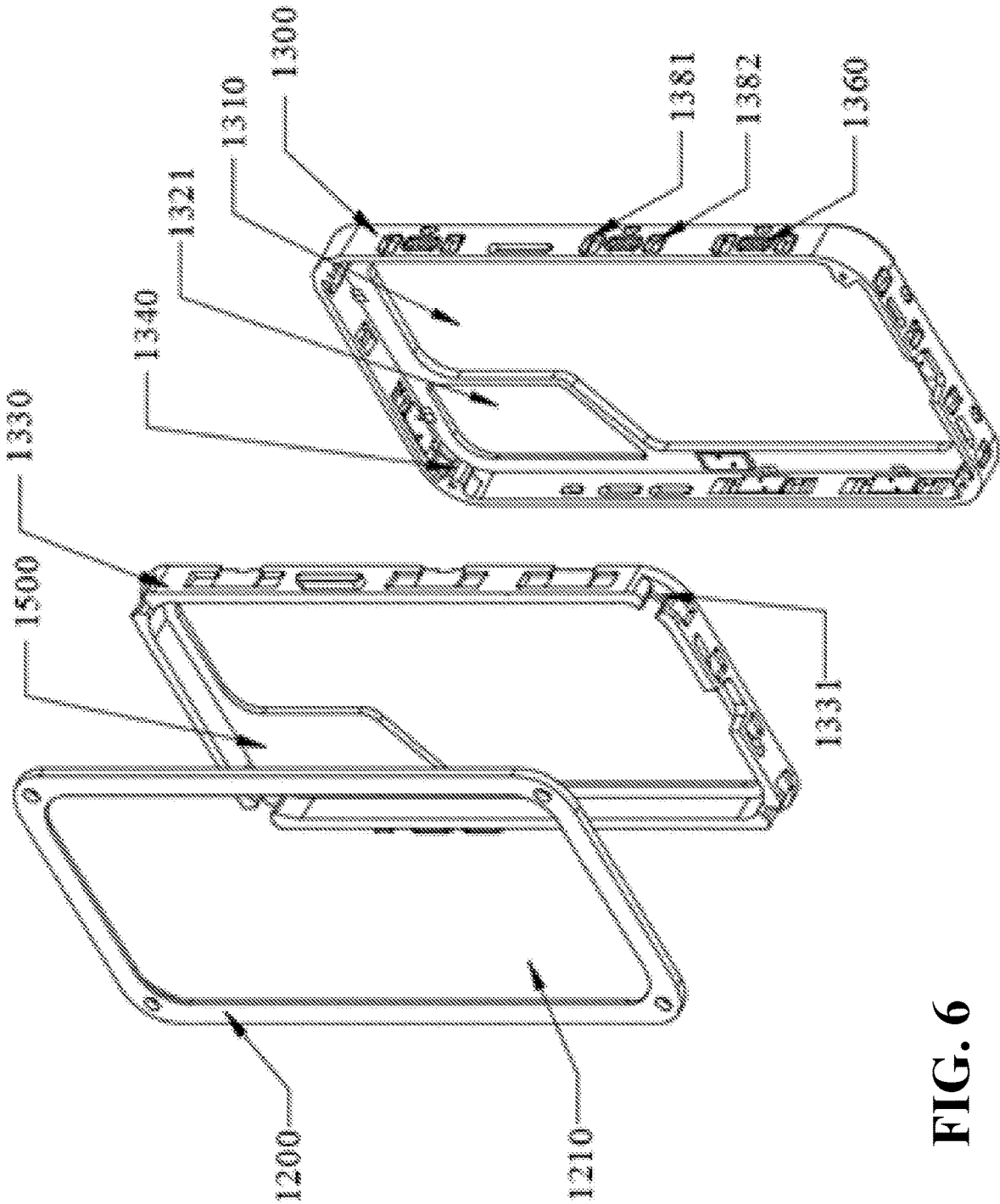
FIG. 6 is an exploded view of the structure of a shell component in one embodiment.
Figure 7:
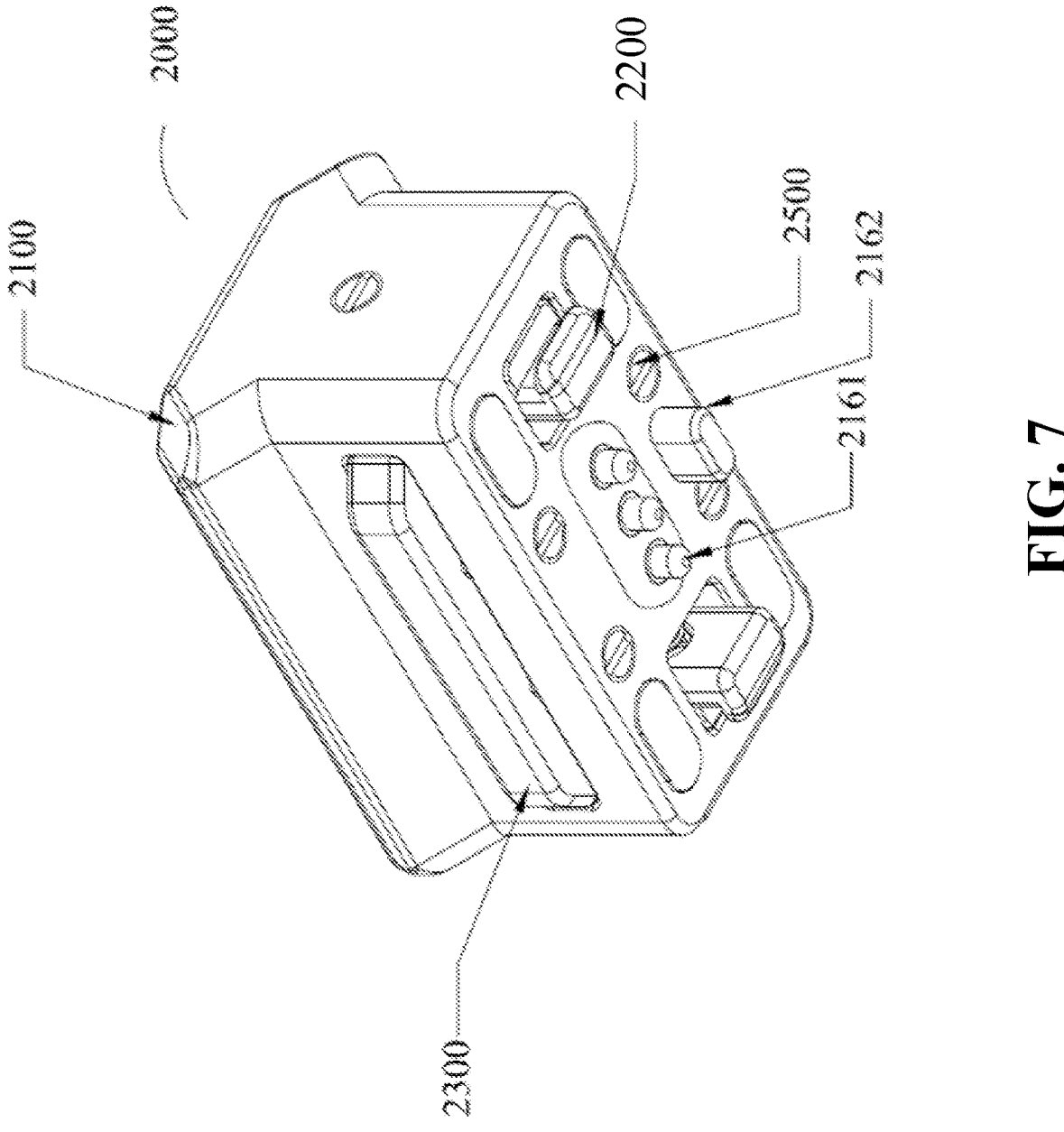
FIG. 7 is a schematic diagram of the structure of a disassembly and assembly component in one embodiment.

Wherein:

1000, shell component; 1100, containment cavity; 1200, first shell; 1210, first through hole; 1300, second shell; 1310, second through hole; 1320, mounting part; 1321, mounting groove; 1330, buffer layer; 1331, first limiting member; 1340, second limiting member; 1350, mounting interface; 1360, electronic contact; 1370, locating hole; 1380, mounting hole; 1381, first mounting hole; 1382, second mounting hole; 1400, threaded connector; 1500, control module.

2000, disassembly and assembly component; 2100, installation base; 2110, first limiting groove; 2120, second limiting groove; 2130, third limiting groove; 2140, sliding groove; 2150, first end; 2160, second end; 2161, electronic probe; 2162, locating pillar; 2170, limiting part; 2171, limiting groove; 2200, clamping unit; 2210, first clamping unit; 2211, first abutting surface; 2212, first clamping part; 2220, second clamping unit; 2221, second abutting surface; 2222, second clamping part; 2300, triggering unit; 2310, first triggering part; 2320, second triggering part; 2330, connecting part; 2331, limiting hole; 2340, first direction; 2350, second direction; 2400, elastic member; 2410, first elastic member;

2420, second elastic member; 2500, limiting pillar; 2600, elastic body; 2700, first pivot; 2800, second pivot;

3000, electronic device.

4000, magnetic component.

DETAILED DESCRIPTION

The following detailed description is made in conjunction with the accompanying drawings to further illustrate the present application. Similar components in different embodiments are denoted by similar reference numerals. In the following embodiments, many details are described for a better understanding of the present application. However, those skilled in the art will readily recognize that some features may be omitted in different situations or replaced by other components, materials, or methods. In some cases, certain operations related to the present application are not shown or described in the specification to avoid overwhelming the essence of the present application with excessive details. For those skilled in the art, detailed descriptions of these operations are not necessary, and they can be fully understood based on the description in the specification and general technical knowledge in this field.

Additionally, features, operations, or characteristics described in the specification may be combined in any suitable manner into various embodiments, and the operational steps involved in each embodiment may be rearranged or adjusted in a manner readily apparent to those skilled in the art. Therefore, the specification and drawings are only intended to describe one embodiment clearly and do not imply the necessary composition and/or sequence.

In this specification, the serial numbers assigned to components themselves, such as "first", "second", etc., are used only to distinguish the described objects and do not have any order or technical significance. The terms "connection" and "linking", unless otherwise specified, include both direct and indirect connections (links).

Currently available electronic devices on the market have increasingly optimized photographic functions. However, these devices typically meet only the general shooting needs of users, and their capabilities are relatively limited. When users want to use additional accessories, such as lights, microphones, it becomes challenging to fulfill more diverse photography requirements. The protective shell of electronic devices is commonly used to enhance aesthetics and comfort, as well as to protect the device. This application creatively utilizes the shell by incorporating a novel structural design that allows for the installation of multiple photographic accessories. The design integrates photographic accessories and electronic devices through disassembly and assembly components, enhancing the convenience of photography with electronic devices.

The term "electronic device" as used in this specification can include mobile phones, tablet computers, or other electronic devices with accessory attachment needs.

Referring to FIGS. 1-20, the present application provides an electronic device kit applying the disassembly and assembly component, including a shell component 1000 and a disassembly and assembly component 2000. The shell component 1000 has a containment cavity 1100, which is used to accommodate an electronic device 3000. The disassembly and assembly component 2000 is arranged on the shell component 1000 to install photography accessories (not shown in the drawings).

By providing the basic function of accommodating and placing electronic devices 3000 with the shell component 1000 and setting the disassembly and assembly component 2000 on it, the foundation for installing photography accessories is laid, enabling the photography accessories to be connected to the disassembly and assembly component 2000 as an integral structure, improving the convenience of photography.

Referring to FIGS. 1-6, the shell component 1000 includes a first shell 1200 and a second shell 1300. The first shell 1200 is provided with a first through hole 1210, which is used to expose the display screen of the electronic device 3000. The first shell 1200 and the second shell 1300 together form the containment cavity 1100. The second shell 1300 is provided with a second through hole 1310, which corresponds in position to the first through hole 1210. The second through hole 1310 is used to expose the side of the electronic device 3000 opposite to the display screen. An installation part 1320 is provided inside the second through hole 1310 and is integrally connected to the second shell 1300 to restrict the electronic device 3000. A buffer layer 1330 is provided on the side of the second shell 1300 facing the containment cavity 1100, and the buffer layer 1330 is connected to the installation part 1320 and can play a buffering role, ensuring that the electronic device 3000 is firmly installed. The buffer layer 1330 is provided with a first limiting member 1331, and the second shell 1300, facing the containment cavity 1100, is also provided with a second limiting member 1340. The second limiting member 1340 engages with the first limiting member 1331 to limit and fix the buffer layer 1330.

Furthermore, the first limiting member 1331 and the second limiting member 1340 may be projections and recesses, or recesses and projections, respectively, and these two complement each other structurally for the fixed positioning of the buffer layer 1330.

Furthermore, for the convenience of fixing the electronic device 3000, the first shell 1200 and the second shell 1300 can be detachably connected. The first shell 1200 and the second shell 1300 can be detachably connected by a snap-fit or screw-fit method.

Preferably, in one embodiment, the first shell 1200 and the second shell 1300 are connected by a threaded connector 1400 (which can be a connecting screw or bolt). When in use, the threaded connector 1400 is disassembled, the first shell 1200 and the second shell 1300 are separated, and the electronic device 3000 is placed in contact with the installation part 1320 on the side opposite to the display screen. The electronic device 3000 is installed without affecting its functionality. Then, the second shell 1300 is connected to the first shell 1200 through the threaded connector 1400 for the fixed positioning of the electronic device 3000.

In a specific and illustrative embodiment, to further enhance the functionality of the shell component 1000 and facilitate the use of photographic accessories, it also includes a control module 1500 and a cable (not shown in the drawings). The control module 1500 and the cable are arranged in the containment cavity 1100, and at least one installation interface 1350 is provided on the side wall of the shell component 1000. At least one installation interface 1350 is provided with an electronic contact 1360, and the two ends of the cable are respectively connected to the electronic contact 1360 and the control module 1500. The electronic contact 1360 contacts the disassembly and assembly component 2000 to enable circuit connection for the photographic accessory powering and/or information transmission.

Furthermore, the electronic contact 1360 is arranged on the side of the buffer layer 1330 near the second shell 1300, allowing it to pass through the installation interface 1350 and contact the disassembly and assembly component 2000.

Specifically, the control module 1500 includes a power supply control module and/or a data processing control module. By setting the power supply control module, the electronic device shell becomes a power bank, capable of charging external photographic accessories. Based on proper setting, the data processing control module can be connected to the circuit of the electronic device 3000, enabling data transfer from the photographic accessory to the electronic device for information sharing.

Furthermore, not all installation interfaces 1350 are provided with electronic contacts 1360. The position where the disassembly and assembly component 2000 is not provided with electronic contacts 1360 may be only for connecting the shell component 1000 and the photographic accessory, and electronic contacts 1360 can be provided as needed. The position where the electronic contact 1360 is arranged can enable power supply or information sharing through circuit connection.

In a specific and illustrative embodiment, the control module 1500 is arranged in the installation part 1320, and the cable is arranged on the buffer layer 1330 and passes through it to connect to the electronic contact 1360 electrically. Alternatively, the cable is set between the buffer layer 1330 and the second shell 1300, with one end connected to the electronic contact 1360 and the other end connected to the control module 1500 electrically.

Furthermore, the installation part 1320 is provided with an installation groove 1321, where the control module 1500 is located.

In one embodiment, the disassembly and assembly component 2000 can be integrated with the shell component 1000.

Of course, in other embodiments, the disassembly and assembly component 2000 can also be detachably connected to the shell component 1000 for easier storage and use.

In one embodiment, the disassembly and assembly component 2000 is connected to the shell component 1000 by clamping.

In another embodiment, the second shell 1300 has at least one installation hole 1380, and the disassembly and assembly component 2000 is clamped in the installation hole 1380, with the disassembly and assembly component 2000 engaged with the shell component 1000.

Furthermore, the number of installation holes 1380 can be adjusted to meet usage needs for installing multiple disassembly and assembly components 2000.

The disassembly and assembly component 2000, shown in FIGS. 7-20, consists of an installation base 2100, a clamping unit 2200, and a triggering unit 2300. The installation base 2100 houses the clamping unit 2200, which is movably (e.g., spring-loaded and/or elastically) arranged and includes two clamping units: the first clamping unit 2210 and the second clamping unit 2220. These clamping units are used to clamp or release the shell component 1000. The triggering unit 2300 is movably (e.g., spring-loaded and/or elastically) mounted within the installation base 2100 and consists of a first triggering part 2310 and a second triggering part 2320. The first triggering part 2310 abuts against the first clamping unit 2210, while the second triggering part 2320 abuts against the second clamping unit 2220. The purpose is to move the first clamping unit 2210 and the second clamping unit 2220 closer or farther away from each other. This action installs the disassembly and assembly component 2000 onto the shell component 1000.

Upon releasing the triggering unit, the first clamping unit 2210 and the second clamping unit 2220 reset.

Figure 8:
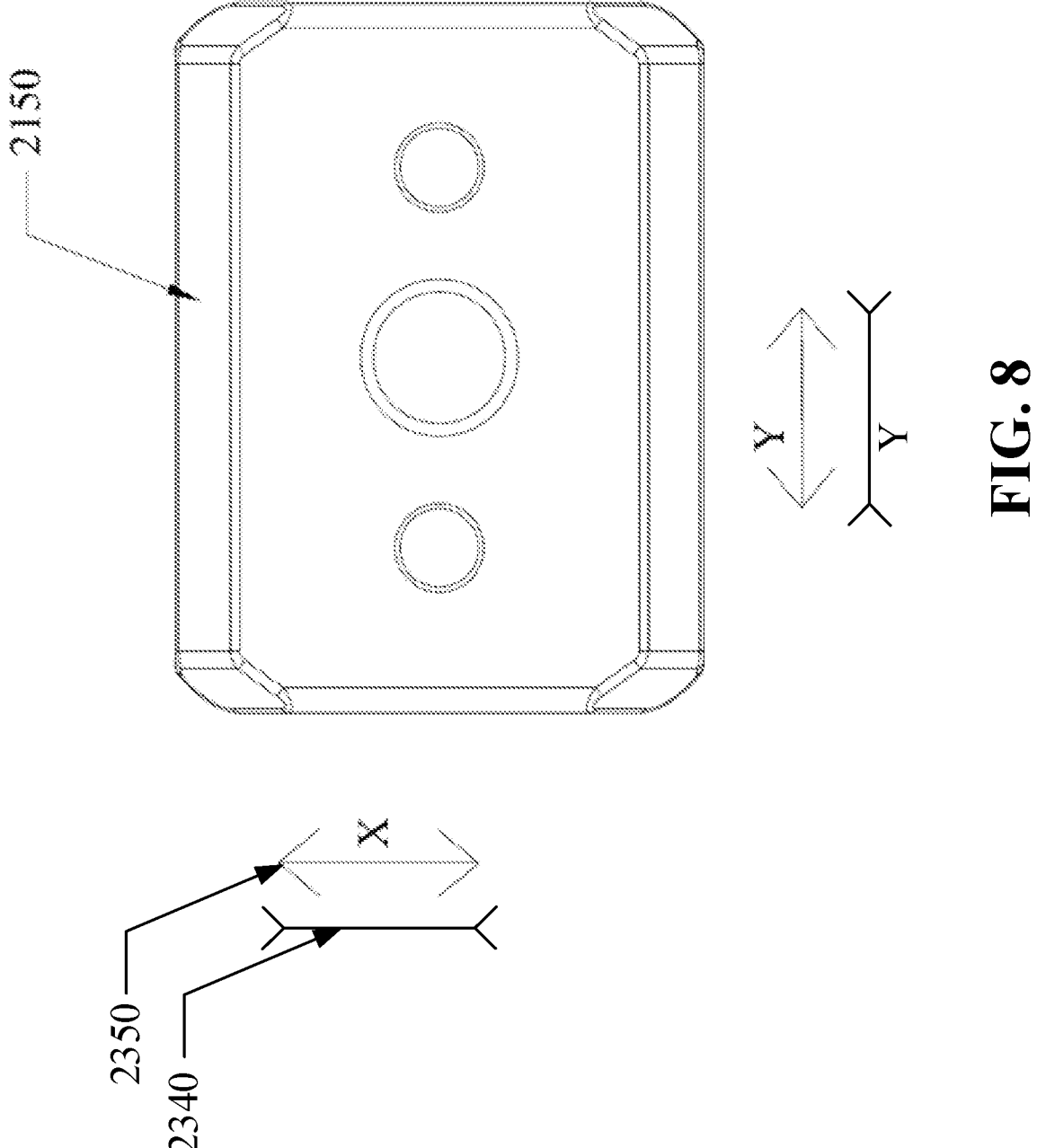
FIG. 8 is a top view of the structure of the disassembly and assembly component of FIG. 7.
Figure 9:
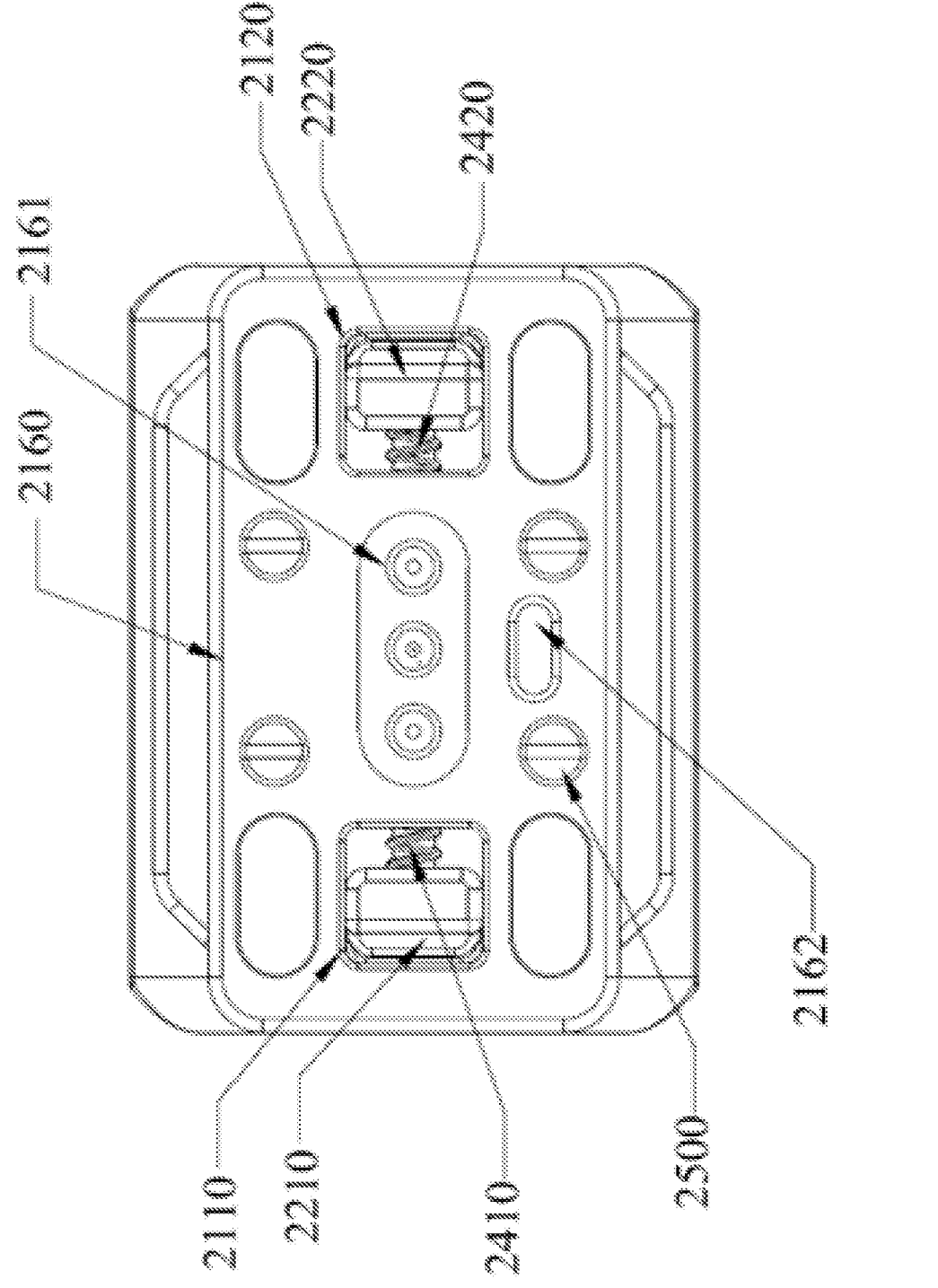
FIG. 9 is a bottom view of the structure of the disassembly and assembly component of FIG. 7.
Figure 10:
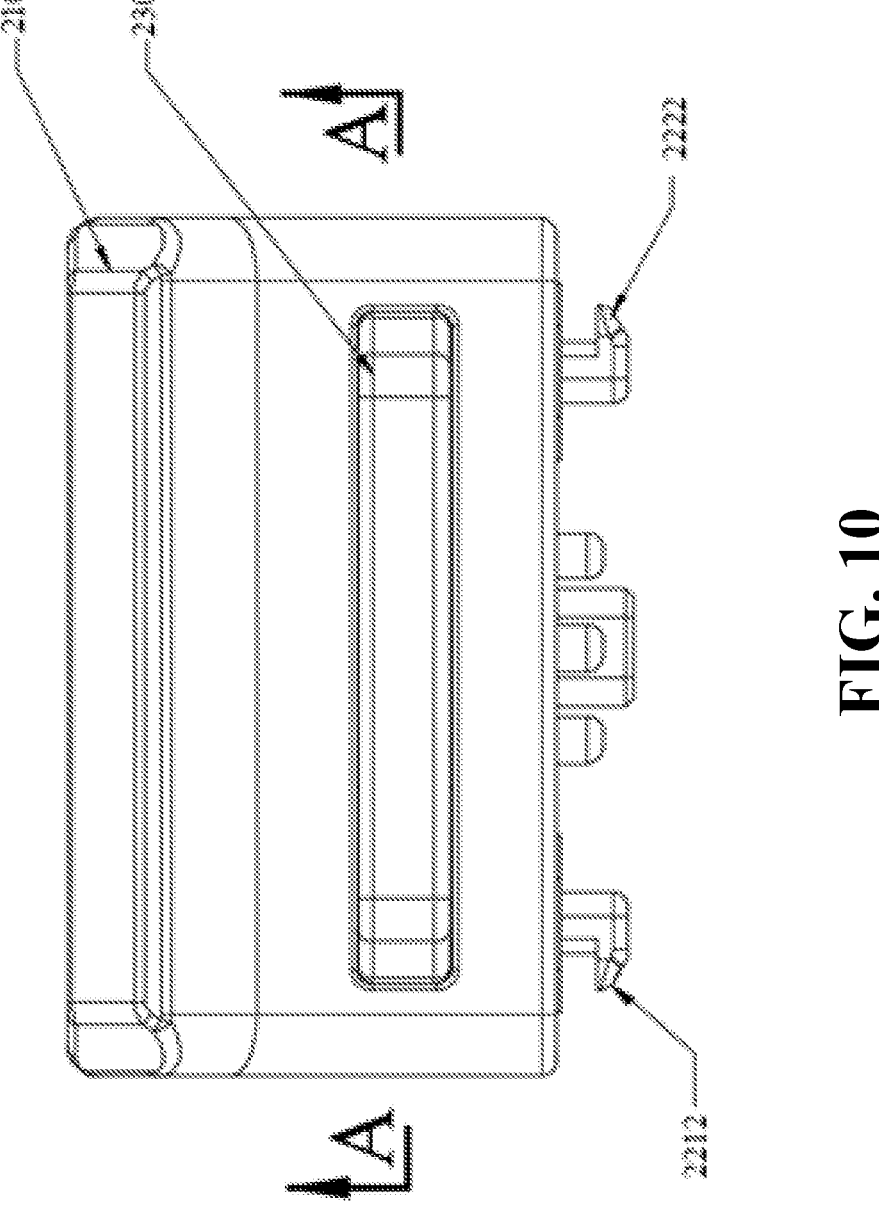
FIG. 10 is a side view of the structure of the disassembly and assembly component of FIG. 7.

In this embodiment, taking the first direction 2340 and the second direction 2350 shown in FIG. 8 as an example for illustration. When the triggering unit 2300 is actuated, the first triggering part 2310 and the second triggering part 2320 move in the first direction 2340, driving the first clamping unit 2210 and the second clamping unit 2220 to approach or move away from each other (corresponding to the installation base 2100). Upon releasing the triggering unit, the first clamping unit 2210 and the second clamping unit 2220 reset, and the triggering unit 2300 moves in the second direction 2350 (X-direction). The first direction 2340 and the second direction 2350 are opposite.

It should be noted that, based on the top view in FIG. 8, the first and second directions in this embodiment are parallel to each other, e.g. X direction (vertically). The first direction 2340 is from the upper or lower side of the installation base 2100 toward the center, while the second direction 2350 moves away from the center. The first clamping unit 2210 and the second clamping unit 2220 move horizontally, namely in the Y direction. When changing perspectives, such as a 90° switch, the first direction 2340 and the second direction 2350 also change accordingly.

It should be further clarified that the clamping unit 2200 in the installation base 2100 can be movably arranged either by itself or with the assistance of an external elastic member 2400 (e.g., spring). The triggering unit 2300 is similarly movably arranged.

The triggering unit 2300 and elastic member 2400 work together to move the first clamping unit 2210 and second clamping unit 2220 towards or away from each other. This action clamps or releases the disassembly and assembly component 2000 on the shell component 1000.

In this embodiment, the first clamping unit 2210 and the second clamping unit 2220 extend from the installation base 2100 and are each equipped with a clamping part, namely the first clamping part 2212 and the second clamping part 2222, respectively. These clamping parts are arranged to face each other. When an external force triggers the triggering unit 2300, the first clamping unit 2210 and the second clamping unit 2220 approach each other, allowing the first clamping part 2212 and the second clamping part 2222 to grip the shell component 1000, or move away from each other. Releasing the triggering unit 2300 causes the first clamping unit 2210 and the second clamping unit 2220 to move away from each other and reset, thereby releasing the shell component 1000.

In this embodiment, installation holes 1380 on the shell component 1000 may be optionally set. The first clamping part 2212 and the second clamping part 2222 can be engaged with the shell component 1000 through the installation holes 1380 for installation. Alternatively, the first clamping part 2212 and the second clamping part 2222 can directly clamp the shell component 1000 for installation.

In another embodiment, the first clamping unit 2210 and the second clamping unit 2220 extend from the installation base 2100 and are each equipped with a clamping part, namely the first clamping part 2212 and the second clamping part 2222, respectively. These clamping parts are arranged in a back-to-back manner. When an external force triggers the triggering unit 2300, the first clamping unit 2210 and the second clamping unit 2220 approach each other or move away from each other. When an external force triggers the triggering unit 2300, the first clamping unit 2210 and the second clamping unit 2220 approach each other, releasing the first clamping part 2212 and the second clamping part 2222 from the installation hole 1380. This allows the first clamping part 2212 and the second clamping part 2222 to move freely within the installation hole 1380, making it easier to remove or place them. When an external force releases the triggering unit 2300, the resistance preventing the first clamping unit 2210 and the second clamping unit 2220 from separating disappears. The elastic member 2400 then provides the driving force to move the clamping units away from each other and reset them. After the first clamping part 2212 and the second clamping part 2222 are separated and reset, they engage with the installation hole 1380 to clamp the shell component 1000.

In this embodiment, the installation holes 1380 are located on the shell component 1000. The first clamping part 2212 and the second clamping part 2222 are engaged with the shell component 1000 through the installation holes 1380 for installation.

In a specific and illustrative embodiment, the first clamping unit 2210 has a first abutting surface 2211, against which the first triggering part 2310 abuts and moves. The second clamping unit 2220 has a corresponding abutting surface 2221, against which the second triggering part 2320 abuts and moves.

Furthermore, the first abutting surface 2211 and the second abutting surface 2221 are inclined surfaces. When the first triggering part 2310 and the second triggering part 2320 move in the first direction 2340, they abut against the first and second abutting surfaces, respectively. This causes the first clamping unit 2210 and the second clamping unit 2230 to move closer or farther away from each other in a direction perpendicular to the first direction 2340. When the first clamping unit 2210 and the second clamping unit 2230 move apart or towards each other perpendicular to the first direction 2340 to reset, their respective abutting surfaces 2211 and 2221 come into contact with the first triggering part 2310 and the second triggering part 2320. This causes the first triggering part 2310 and the second triggering part 2320 to move along the second direction 2350, which is opposite to the first direction 2340.

Figure 11:
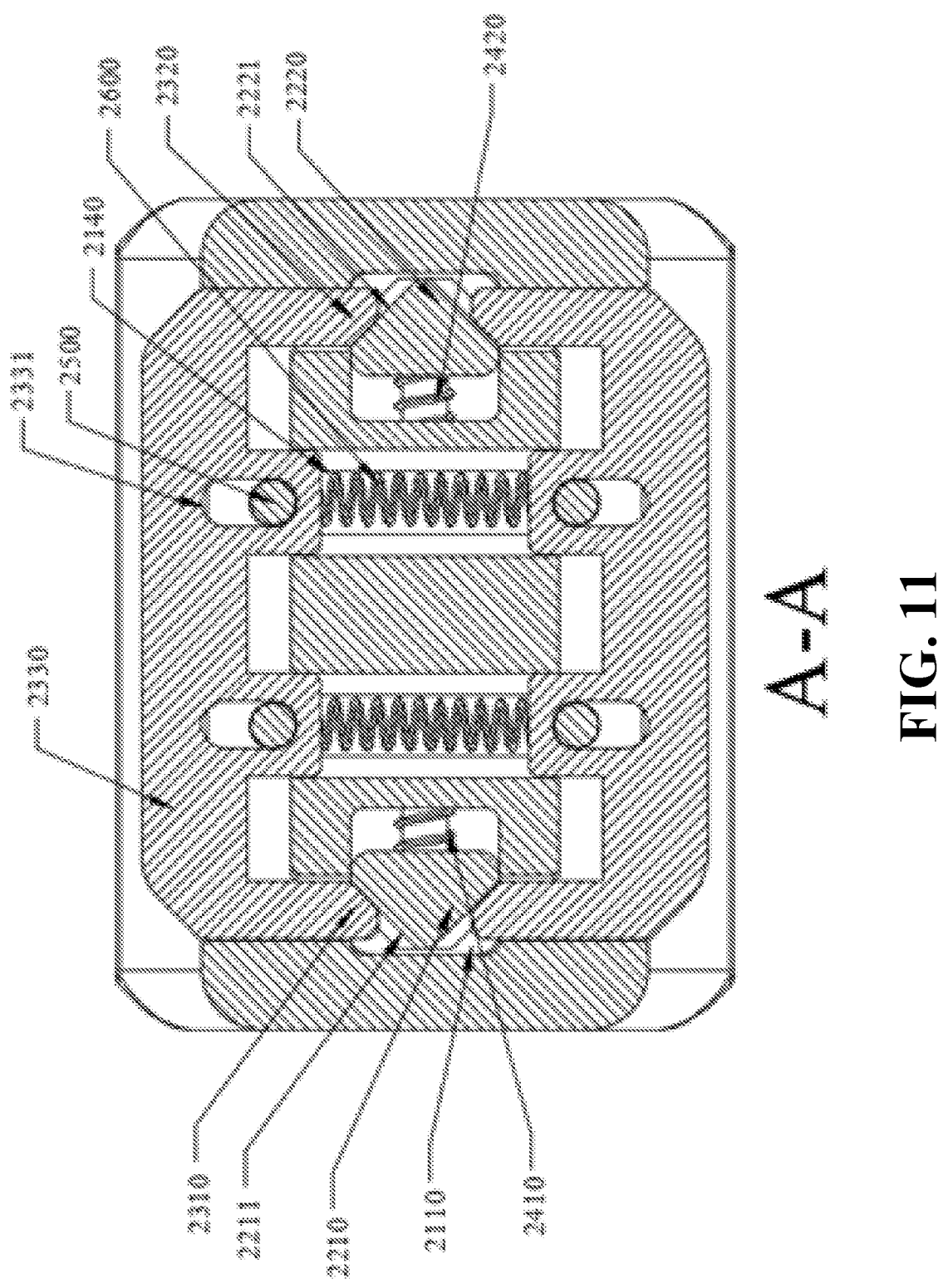
FIG. 11 is a sectional schematic view taken along line A-A in FIG. 10.
Figure 12:
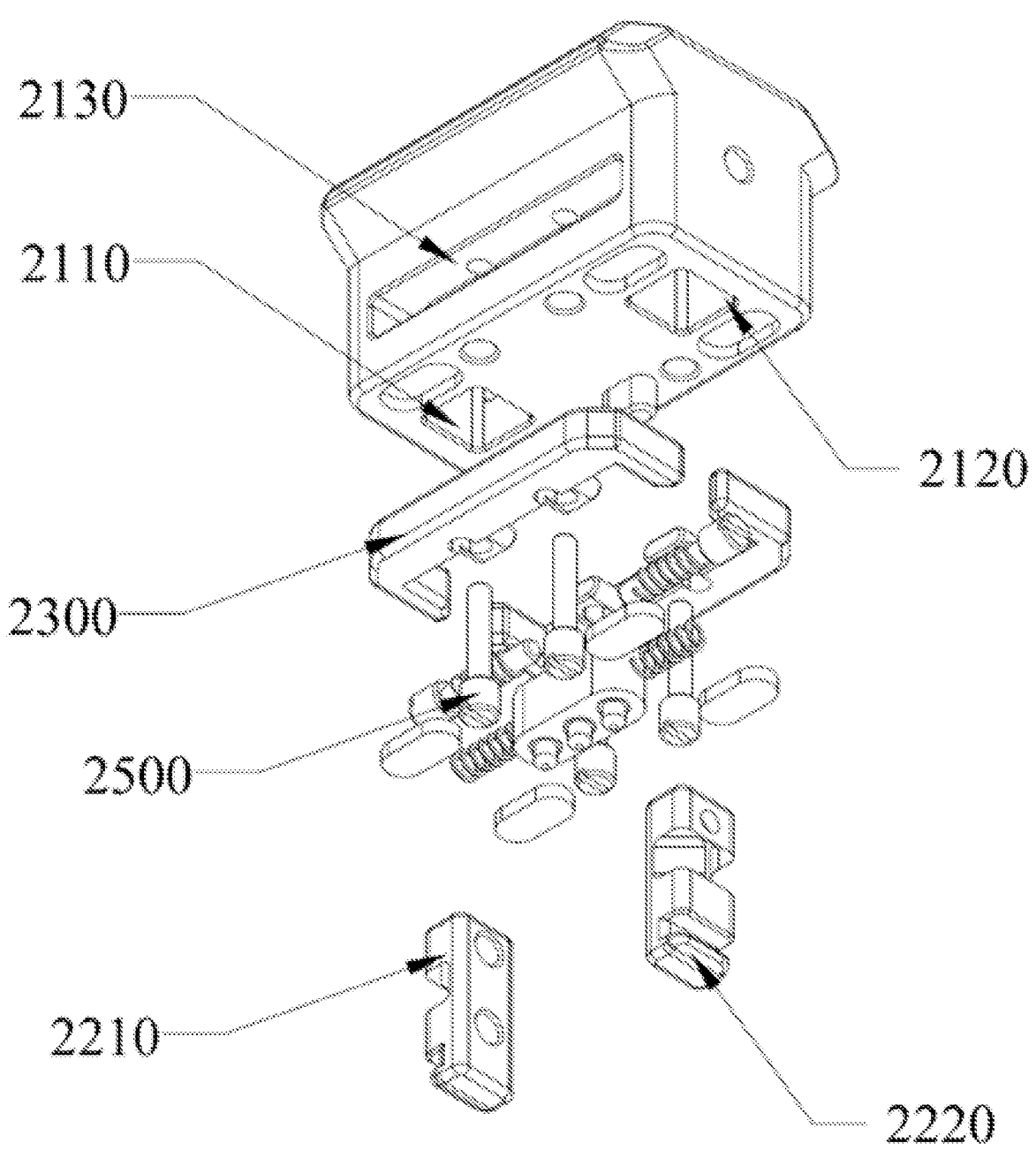
FIG. 12 is an exploded view of the structure of the disassembly and assembly component of FIG. 7.
Figure 13:
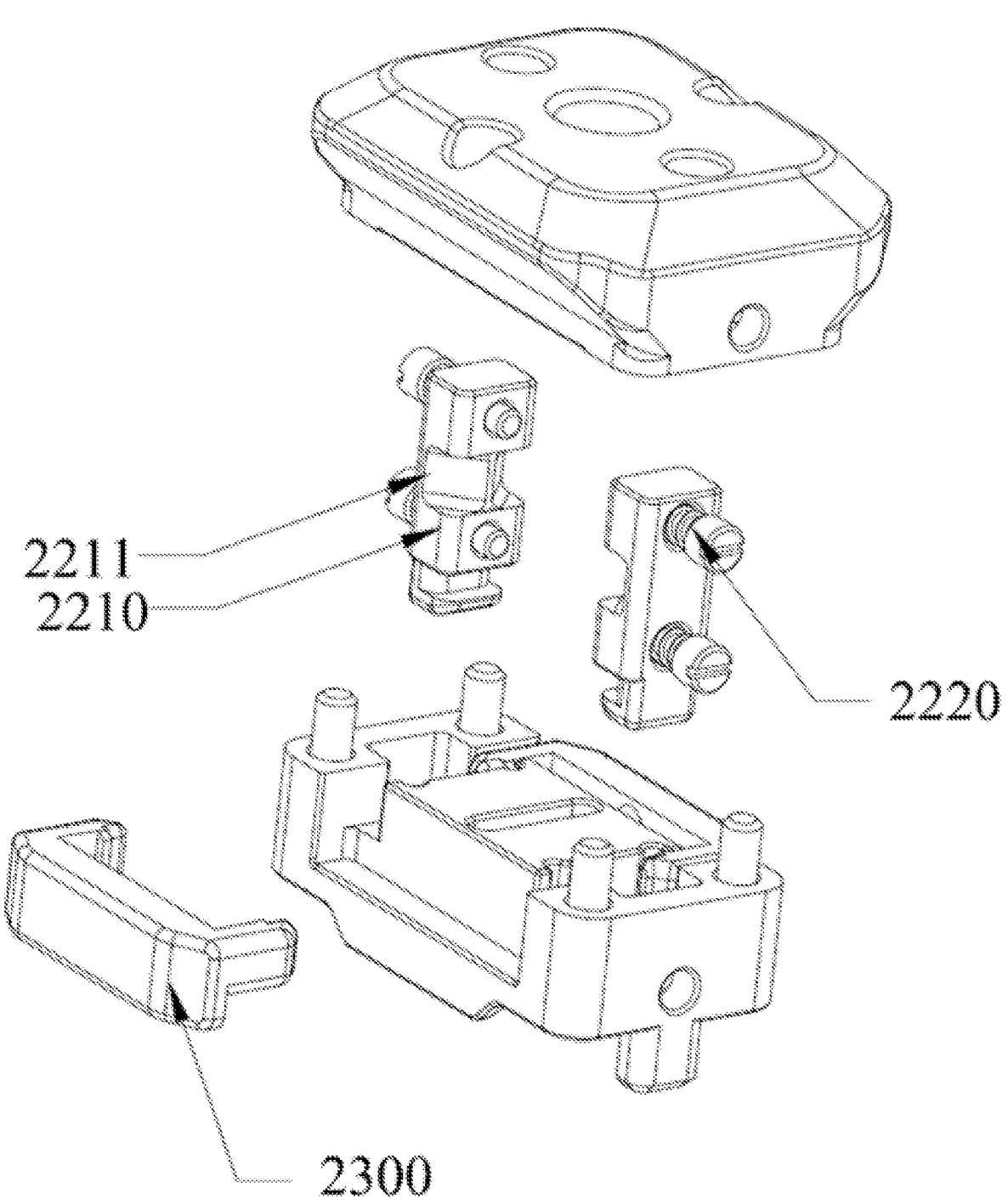
FIG. 13 is an exploded view of the structure of a disassembly and assembly component in another embodiment.
Figure 14:
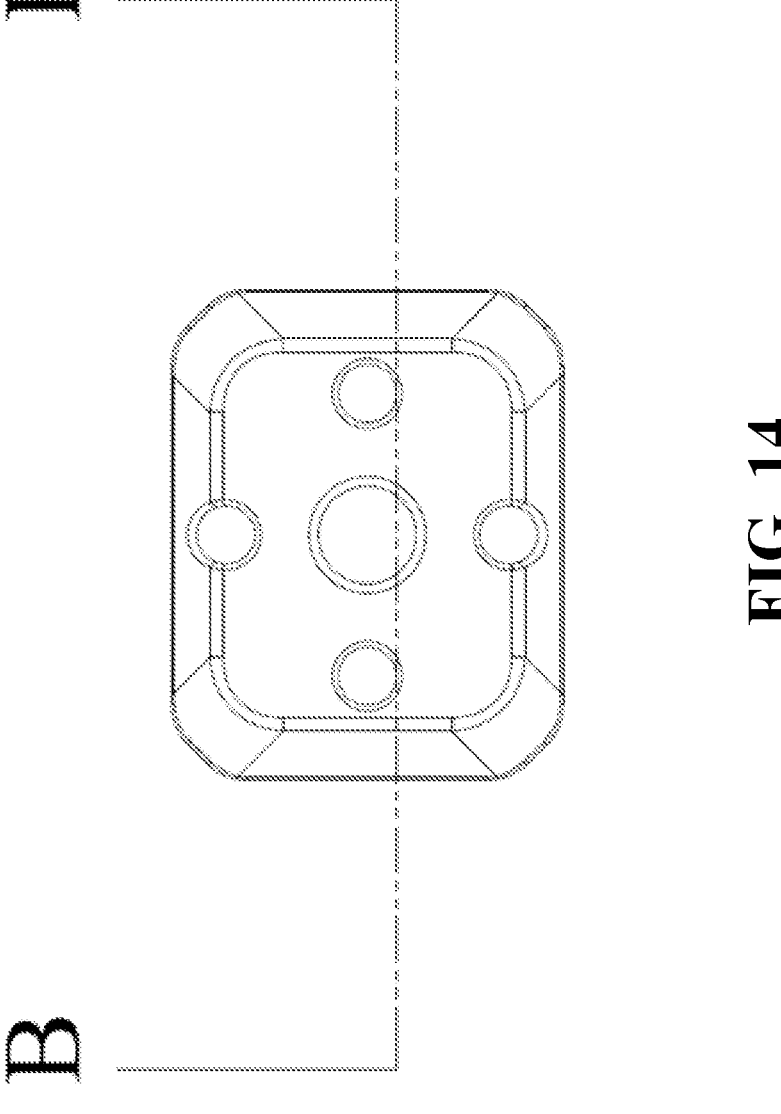
FIG. 14 is a top view of the structure of the disassembly and assembly component of FIG. 13.
Figure 15:
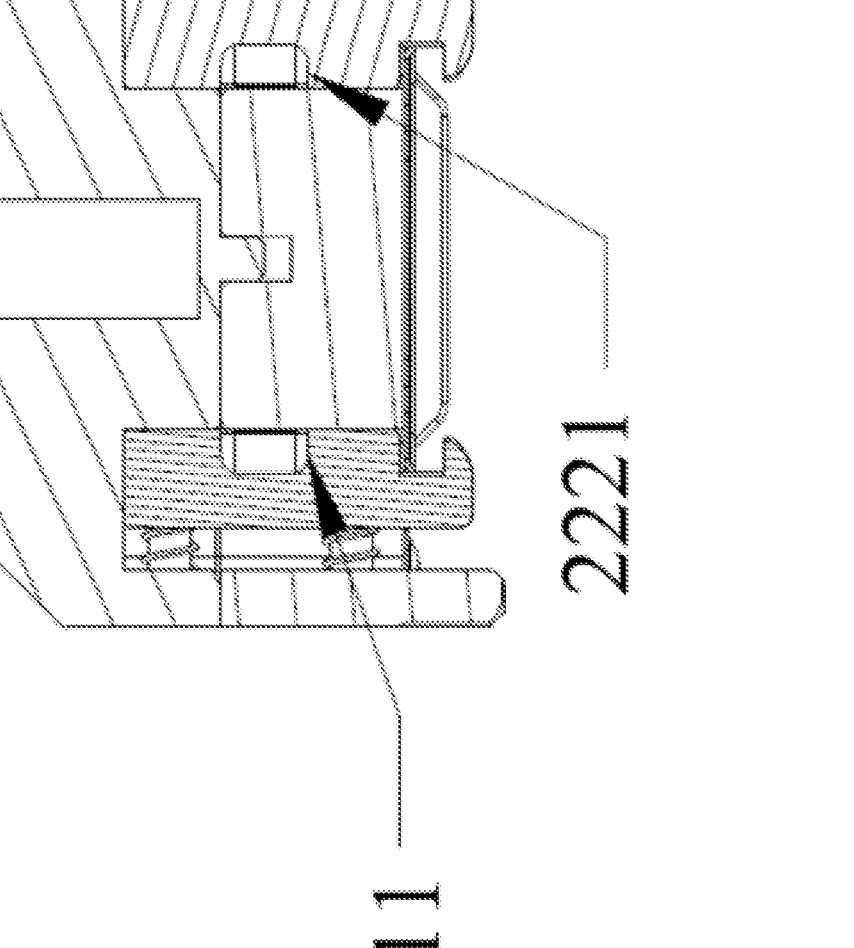
FIG. 15 is a sectional schematic view taken along line B-B in FIG. 14.
Figure 16:
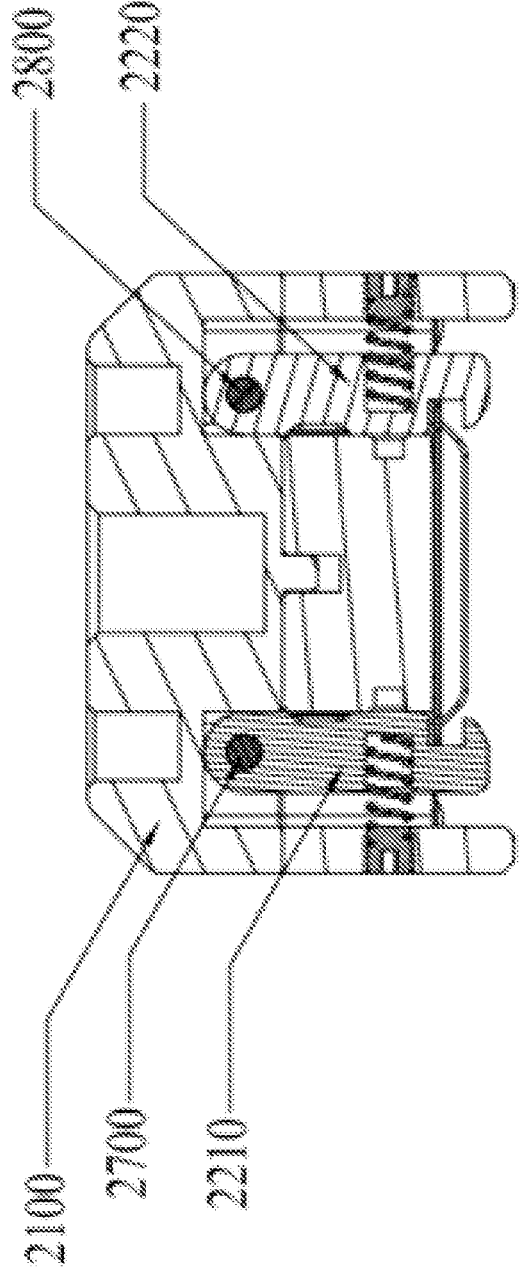
FIG. 16 is a sectional schematic view of line B-B in FIG. 14 in another embodiment.

In a specific embodiment, please refer to FIGS. 11 and 12. The first triggering part 2310 and the second triggering part 2320 are located on the opposite side of the first clamping unit 2210 and the second clamping unit 2230. Similarly, the first abutting surface 2211 and the second abutting surface 2221 are also located on the opposite side of the first clamping unit 2210 and the second clamping unit 2230.

Specifically, in this embodiment, upon triggering the triggering unit 2300 through external force, the first clamping unit 2210 and the second clamping unit 2220 move closer to each other, leading to the rapid withdrawal of the first clamping part 2212 and the second clamping part 2222 from the installation hole 1380. In essence, they are swiftly detached from the shell component 1000. The first clamping unit 2210 and the second clamping unit 2220 can move freely within the installation hole 1380, simplifying removal or insertion into the installation hole 1380. Upon withdrawal of the external force, releasing the triggering unit 2300 eliminates the resistance preventing the mutual separation of the first clamping unit 2210 and the second clamping unit 2220. Simultaneously, the clastic member 2400 imparts a driving force to the first clamping unit 2210 and the second clamping unit 2220, causing them to move away from each other. Within the installation hole 1380, following the mutual separation of the first clamping part 2212 and the second clamping part 2222, their engagement with the installation hole 1380 from the inside out is achieved, thereby clamping the shell component 1000.

In another embodiment, please refer to FIGS. 13-18, wherein the first triggering part 2310 and the second triggering part 2320 are positioned on the side opposing the first clamping unit 2210 and the second clamping unit 2230. Similarly, the first abutting surface 2211 and the second abutting surface 2221 are located on the side opposing the first clamping unit 2210 and the second clamping unit 2230.

Specifically, in this embodiment, when the triggering unit 2300 is activated by external force, the first clamping unit 2210 and the second clamping unit 2220 move away from each other. Within the installation hole 1380, following their mutual separation, the first clamping unit 2210 and the second clamping unit 2220 engage with the installation hole 1380, effecting the clamping of the shell component 1000. Upon withdrawal of the external force, releasing the triggering unit 2300 eliminates the resistance preventing the mutual approaching of the first clamping unit 2210 and the second clamping unit 2220. Simultaneously, the clastic member 2400 imparts a driving force to the first clamping unit 2210 and the second clamping unit 2220, causing them to approach each other. The first clamping part 2212 and the second clamping part 2222 rapidly exit the installation hole 1380. Essentially, they are expeditiously disengaged from the shell component 1000. The first clamping part 2212 and the second clamping part 2222 can move freely within the installation hole 1380, facilitating their removal or placement within the installation hole 1380.

In a specific and illustrative embodiment, the installation base 2100 is furnished with a first limiting groove 2110, a second limiting groove 2120, and a third limiting groove 2130. A portion of the third limiting groove 2130 is interconnected with both the first limiting groove 2110 and the second limiting groove 2120. The first clamping unit 2210 is mobile within the first limiting groove 2110, the second clamping unit 2220 moves within the second limiting groove 2120, and the triggering unit 2300 is adjustable within the third limiting groove 2130. The first triggering part 2310 extends from the third limiting groove 2130 to make contact with the first abutting surface 2211, while the second triggering part 2320 extends from the third limiting groove 2130 to abut against the second abutting surface 2221.

The interconnection between a part of the third limiting groove 2130, the first limiting groove 2110, and the second limiting groove 2120 entails the third limiting groove 2130 being linked to both the first limiting groove 2110 and the second limiting groove 2120. Additionally, a section of the third limiting groove 2130 connects with the first limiting groove 2110 and the second limiting groove 2120. This design ensures ample space for the movement of the first triggering part 2310 and the second triggering part 2320, facilitating their contact with the first abutting surface 2211 and the second abutting surface 2221, respectively.

In a specific and illustrative embodiment, the elastic member 2400 comprises a first elastic member 2410 and a second elastic member 2420. The first elastic member 2410 is positioned between the wall of the first limiting groove 2110 and the first clamping unit 2210, while the second elastic member 2420 is situated between the wall of the second limiting groove 2120 and the second clamping unit 2220. In some examples, an elastic member can be a spring or an elastic material.

In this embodiment, when the triggering unit 2300 is actuated, the first triggering part 2310 and the second triggering part 2320 move in the first direction 2340, driving the first clamping unit 2210 and the second clamping unit 2220 to approach or move away from each other (corresponding to the installation base 2100). Upon releasing the triggering unit 2300, the first clamping unit 2210 and the second clamping unit 2220 reset.

In an alternate implementation within this embodiment, the elastic member 2400 is situated between the first clamping unit 2210 and the second clamping unit 2220. The quantity is determined as necessary, and in this configuration, a receiving groove is incorporated within the installation base to accommodate the movement of the elastic member 2400. For instance, multiple instances of the first elastic member 2410 are spaced between the wall of the first limiting groove 2110 and the first clamping unit 2210, and correspondingly, multiple instances of the second elastic member 2420 are spaced between the wall of the second limiting groove 2120 and the second clamping unit 2220. This arrangement enhances uniform force distribution on both the first elastic member 2410 and the second elastic member 2420.

In an alternative configuration, the clamping process executed by the first clamping unit 2210 and the second clamping unit 2220 can be accomplished through alternative motion methods. Please refer to FIG. 16, where the end of the first clamping unit 2210, distant from the first clamping part 2212, is pivotally connected to the installation base 2100 through the first pivot 2700. Similarly, one end of the second clamping unit 2220, away from the second clamping part 2222, is pivotally connected to the installation base 2100 through the second pivot 2800.

In this embodiment, when the triggering unit 2300 is actuated, the first triggering part 2310 and the second triggering part 2320 move in the first direction 2340, driving the first clamping unit 2210 and the second clamping unit 2220 to approach or move away from each other (corresponding to the installation base 2100). Upon releasing the triggering unit 2300, the first clamping unit 2210 and the second clamping unit 2220 reset.

In a specific and illustrative embodiment, the installation base 2100 is furnished with limiting pillars 2500, and the triggering unit 2300 includes a connector 2330. The two ends of the connector 2330 are respectively linked to the first triggering part 2310 and the second triggering part 2320. The connector 2330 features a limiting hole 2331, and the limiting pillar 2500 is movably placed within the limiting hole 2331.

Furthermore, the installation base 2100 is also equipped with a sliding groove 2140, with the limiting pillar 2500 positioned within this groove. The connector 2330 is slidably positioned on the limiting pillar 2500 through the limiting hole 2331. The inner wall of the limiting hole 2331 exhibits a sliding connection to the limiting pillar 2500, while the outer wall of the limiting hole 2331 is slidably placed in the sliding groove 2140. These elements work in tandem to confine the movement trajectory of the triggering unit 2300.

Figure 17:
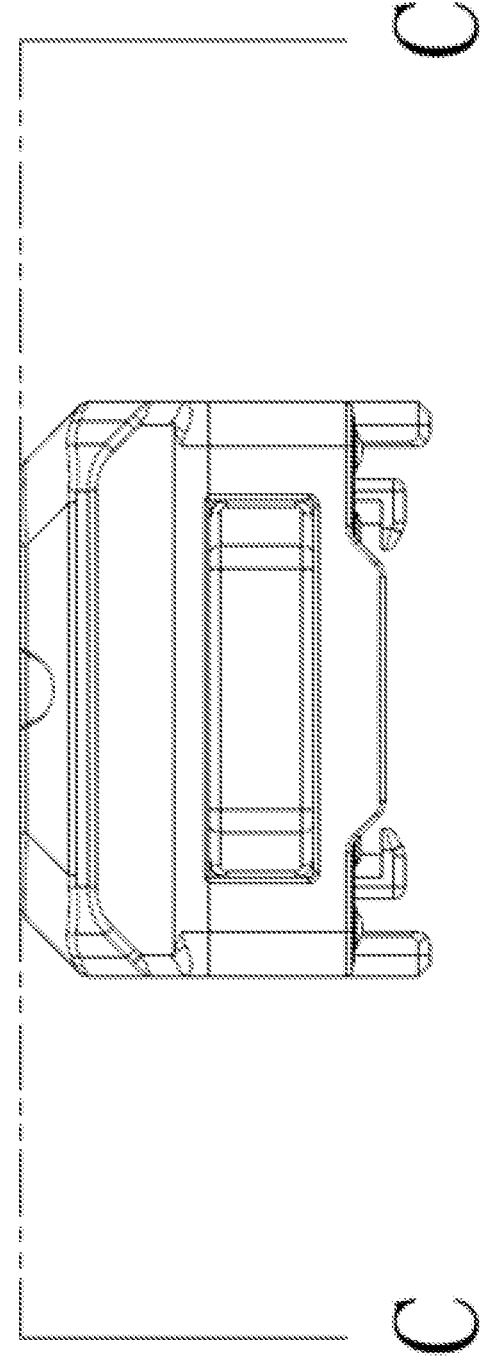
FIG. 17 is a side view of the structure of a disassembly and assembly component in another embodiment.
Figure 18:
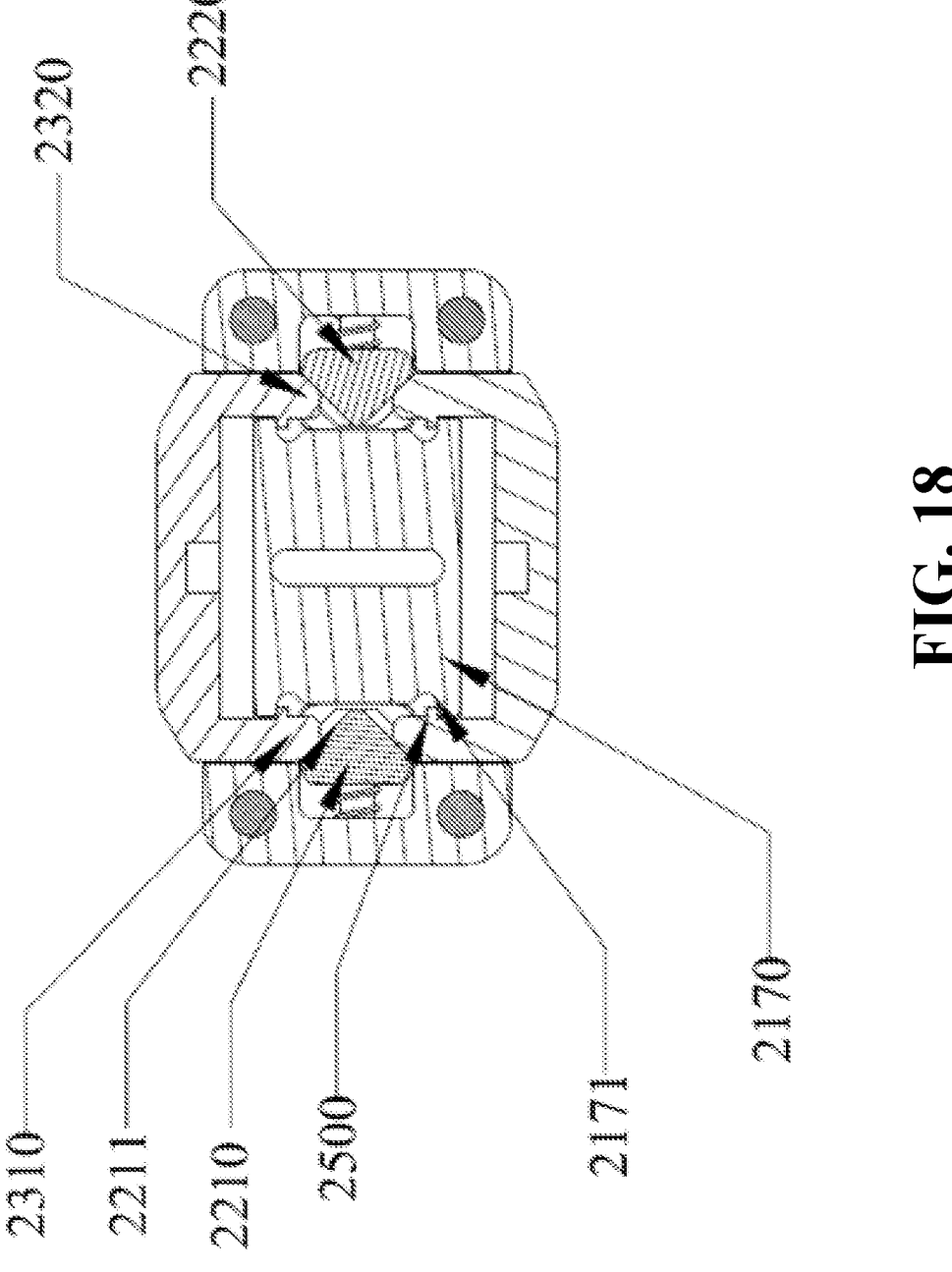
FIG. 18 is a sectional schematic view taken along line C-C in FIG. 17.
Figure 19:
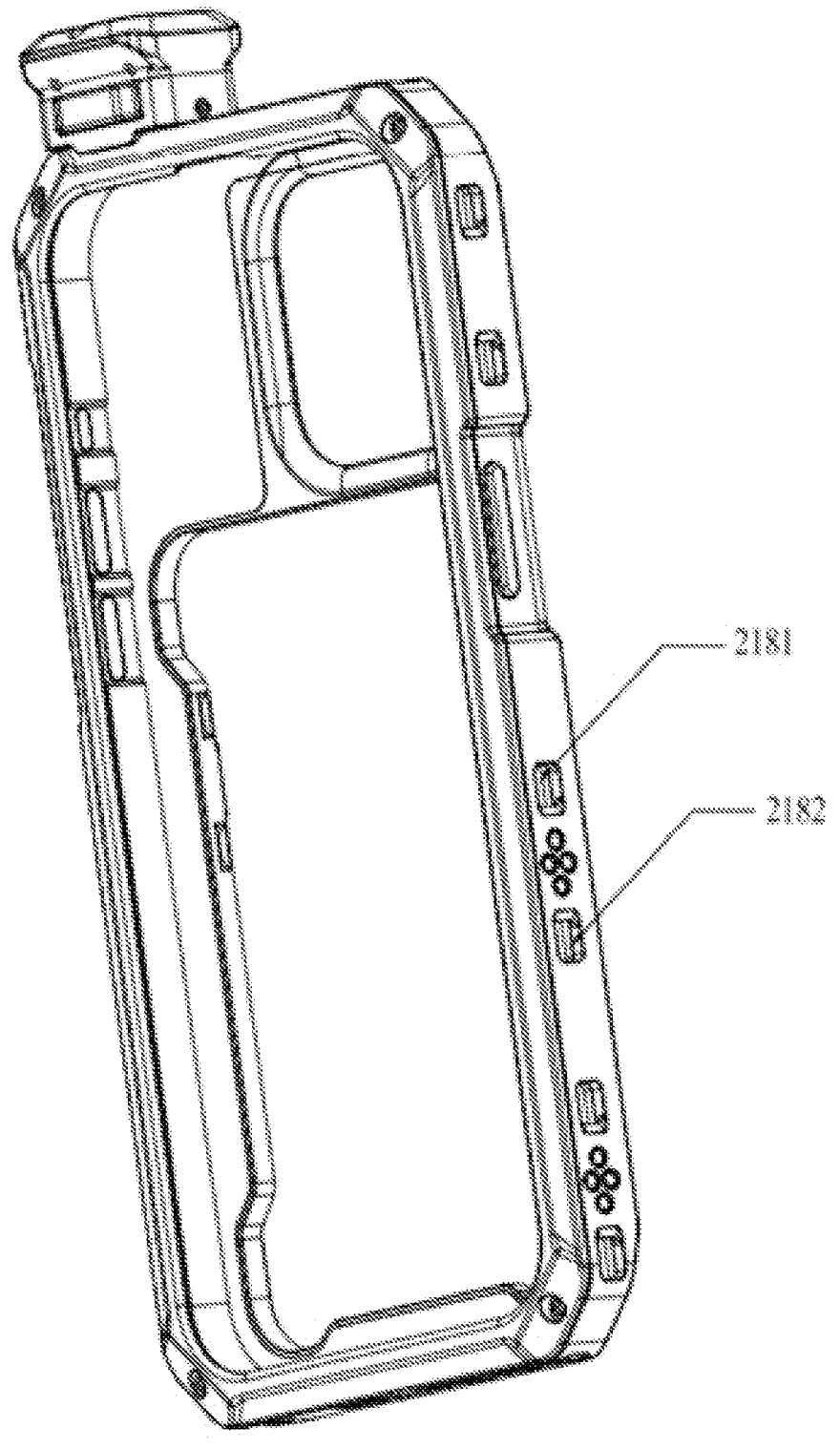
FIG. 19 is a schematic view of the structure of mounting holes in a shell component.
Figure 20:
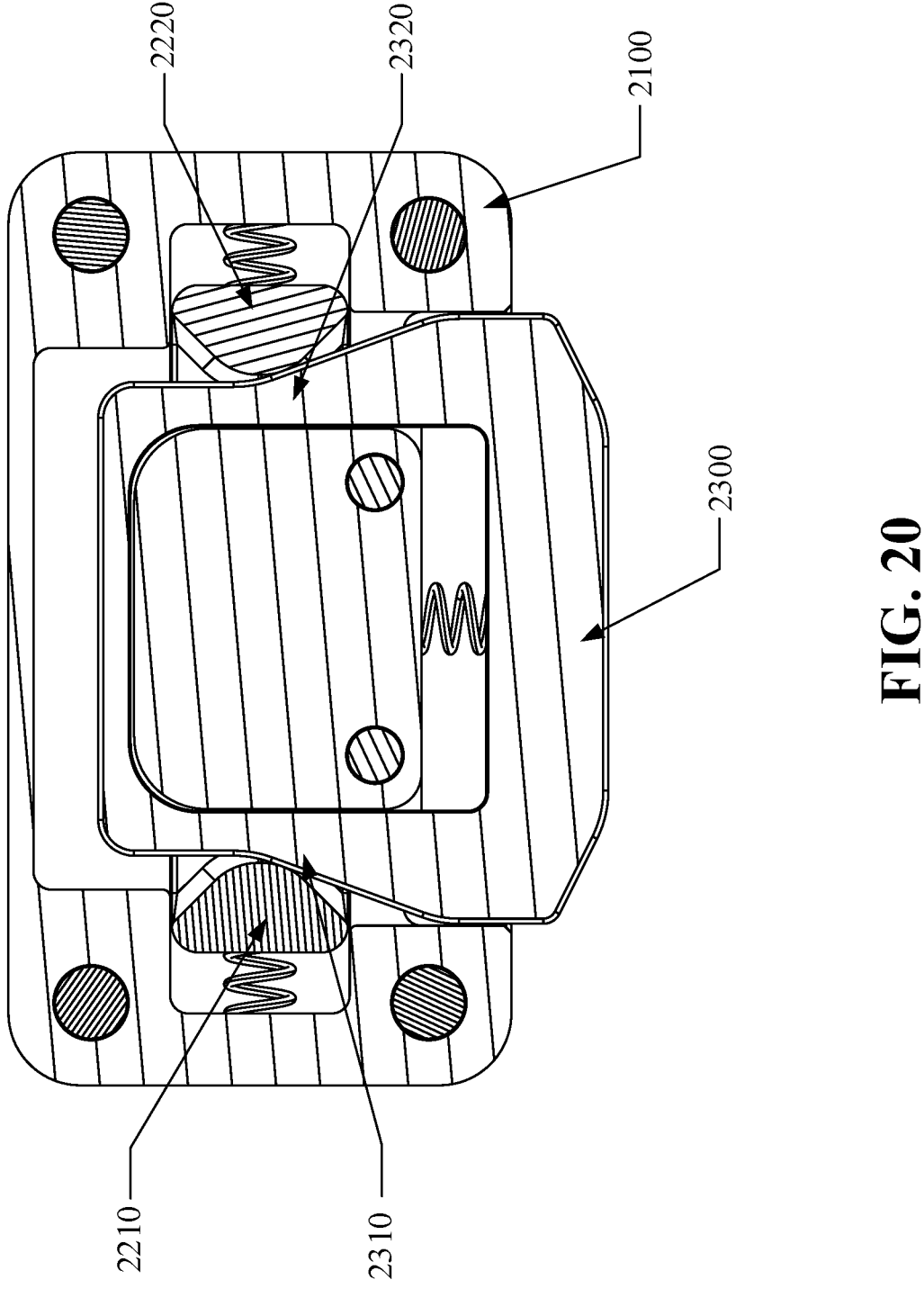
FIG. 20 is another sectional schematic view taken along line C-C in FIG. 17.

Referring to FIG. 17, in another embodiment, the first triggering part 2310 and the second triggering part 2320 have limiting pillars 2500, and the installation base 2100 has a limiting part 2170 with limiting grooves 2171 opened at both ends. The limiting pillars 2500 are movably arranged within the limiting grooves 2171.

In a specific and illustrative embodiment, an elastic body 2600 is also incorporated. The elastic body 2600 is placed between the connector 2330 and the inner wall of the installation base 2100. In some example, the elastic body 2600 may be a spring. Upon releasing the triggering of the triggering unit 2300, the elastic body 2600 propels the triggering unit 2300 to traverse the second direction 2350. This, coupled with the action of the first elastic member

2410 and the second elastic member 2420, induces the clamping unit 2200 to secure against the installation hole 1380.

In a specific and illustrative embodiment, to optimize the user experience, multiple triggering units 2300 are incorporated, and these units are movably positioned within the third limiting groove 2130. Correspondingly, multiple first abutting surfaces 2211 and second abutting surfaces 2221 are provided, with the first triggering part 2310 of the triggering unit 2300 aligning with and abutting against the first abutting surface 2211, and the second triggering part 2320 aligning with and abutting against the second abutting surface 2221. In this arrangement, the elastic body 2600 may be situated between the two triggering units 2300 or between the installation base 2100 and the triggering units 2300 to supply the driving force for their movement along the second direction 2350.

Preferably, the triggering unit 2300 can consist of two units oppositely arranged. The elastic body 2600 is placed between these two triggering units or between the installation base 2100 and the triggering units 2300. Upon triggering these two units, the elastic body 2600 compresses. Upon releasing the triggering of these two units, propelled by the restorative force of the elastic body 2600, the two triggering units 2300 move away from each other.

Furthermore, the quantity of the elastic body 2600 can be chosen as per the requirement, set at a minimum of 1, such as 1, 2, or 3, etc.

In a specific and illustrative embodiment, the installation base 2100 comprises oppositely situated first end 2150 and second end 2160. The first clamping unit 2210 incorporates the first clamping part 2212, and the second clamping unit 2220 features the second clamping part 2222. Extending from the second end 2160, the first clamping part 2212 and the second clamping part 2222 are employed to clamp or release the installation hole 1380. The second end 2160 is equipped with an electronic probe 2161, capable of making contact with the electronic contact 1360 of the shell component 1000 for circuit connection. Additionally, the second end 2160 includes at least one locating pillar 2162, while the shell component 1000 comprises at least one corresponding positioning hole 1370. The locating pillar 2162 is fitted into the positioning hole 1370 for precise positioning and installation with the shell component 1000.

Furthermore, the installation hole 1380 encompasses the first installation hole 1381 and the second installation hole 1382. The first clamping part 2212 is inserted into the first installation hole 1381, and the second clamping part 2222 is inserted into the second installation hole 1382, facilitating the disassembly in clamping the shell component 1000.

Furthermore, the first installation hole 1381 and the second installation hole 1382 are respectively positioned on both sides of the installation interface 1350. Each installation interface 1350 may include two locating holes 1370. The centerline connecting the two locating holes 1370 may run parallel or perpendicular to the centerline connecting the first installation hole 1381 and the second installation hole 1382.

To achieve precise installation positioning and facilitate the swift attachment and removal of the disassembly and assembly component 2000, the second end 2160 is furnished with multiple locating pillars 2162. Two of these pillars are positioned adjacent to the first clamping unit 2210 and the second clamping unit 2220. These two locating pillars 2162 are respectively inserted into the first installation hole 1381 and the second installation hole 1382. In this embodiment, the locating holes 1370 are directly connected to the installation holes 1380 (where one of the locating holes 1370 is connected to the first installation hole 1381, and the other positioning hole 1370 is connected to the second installation hole 1382). Alternatively, by widening the first installation hole 1381 and the second installation hole 1382, the two locating pillars 2162 can follow the first clamping unit 2210 and the second clamping unit 2220 to extend into the first installation interface 1381 and the second installation interface 1382, simplifying the independent positioning steps of the locating pillars 2162, the first clamping unit 2210, and the second clamping unit 2220 during installation. This streamlines the operation process and enhances installation efficiency.

In a specific and illustrative embodiment, the first end 2150 can be equipped with an installation slider, connected to a camera accessory featuring a groove through the installation slider, such as a camera accessory with a built-in mounting groove. When the camera accessory requires power, the installation slider can also include a through hole, allowing the cable of the camera accessory to pass through this opening and connect with the electronic probe 2161 for circuit connection.

In a specific and illustrative embodiment, on the side of the second shell 1300, opposite to the first shell 1200, a magnetic component 4000 is provided. This component can be utilized to connect with a radiator or other functional accessories through the magnetic component 4000.

The above examples are presented to illustrate the disclosure, serving only to facilitate an understanding of the disclosure, and should not be employed to limit the disclosure. For those skilled in the relevant technical field, various straightforward deductions, modifications, or substitutions can still be made based on the concept of the disclosure.

What is claimed is:

1. An electronic device kit, comprising:
a shell component with a cavity for accommodating an electronic device; and
at least one disassembly and assembly component, being detachably mounted on the shell component for installing photography accessories on the shell component, wherein the at least one disassembly and assembly component comprises:
an installation base;
a clamping unit movably arranged within the installation base, and including a first clamping unit and a second clamping unit, which are configured for clamping or releasing the shell component; and
a triggering unit movably arranged within the installation base, and including a first triggering part abutting the first clamping unit and a second triggering part abutting the second clamping unit,
wherein in response to actuating the triggering unit, the first triggering part and the second triggering part are configured to move in a first direction, driving the first clamping unit and the second clamping unit to approach or move away from each other, and
wherein in response to releasing the triggering unit, the first clamping unit and the second clamping unit are configured to reset, and the triggering unit moves in a second direction; and
wherein, the first direction and the second direction are opposite.

2. The electronic device kit according to claim 1, wherein a protruding end of the first clamping unit from the installation base comprises a first clamping part, and a protruding end of the second clamping unit from the installation base comprises a second clamping part; and the first clamping part and the second clamping part are arranged opposite or facing away from each other.

3. The electronic device kit according to claim 1, wherein the first clamping unit comprises a first abutting surface, the first triggering part abuts the first abutting surface, and is moveable on the first abutting surface; and
the second clamping unit comprises a second abutting surface, the second triggering part abuts the second abutting surface, and is moveable on the second abutting surface.

4. The electronic device kit according to claim 3, wherein the first abutting surface and the second abutting surface are arranged on a same side of the first clamping unit and the second clamping unit, or
the first abutting surface and the second abutting surface are respectively arranged on opposite sides of the first clamping unit and the second clamping unit.

5. The electronic device kit according to claim 3, wherein the installation base is provided with at least a first limiting groove, a second limiting groove, and a third limiting groove;
the third limiting groove is at least partially connected to the first limiting groove and the second limiting groove;
the first clamping unit is movably arranged in the first limiting groove, the second clamping unit is movably arranged in the second limiting groove, and the triggering unit is movably arranged in the third limiting groove;
the first triggering part protrudes from the third limiting groove and abuts the first abutting surface, and the second triggering part protrudes from the third limiting groove and abuts the second abutting surface; and
a first elastic member between a wall of the first limiting groove and the first clamping unit, and a second elastic member between a wall of the second limiting groove and the second clamping unit.

6. The electronic device kit according to claim 5, further comprising:
a plurality of first elastic members spaced between a wall of the first limiting groove and the first clamping unit; and
a plurality of second elastic members spaced between a wall of the second limiting groove and the second clamping unit.

7. The electronic device kit according to claim 5, wherein the first clamping unit is pivotally connected to the installation base at a first end away from a first clamping part through a first pivot, and the second clamping unit is pivotally connected to the installation base at a second end away from a second clamping part through a second pivot.

8. The electronic device kit according to claim 1, wherein the triggering unit further comprises:
a connecting part, with a first end of the connecting part connected to the first triggering part and a second end of the connecting part connected to the second triggering part; and
the connecting part is equipped with a limiting hole, and the installation base comprises limiting pillars, which are movably arranged within the limiting hole.

9. The electronic device kit according to claim 1, wherein the first triggering part and the second triggering part respectively comprise a plurality of limiting pillars, and
the installation base comprises a limiting part with a plurality of limiting grooves opened at both ends; and
the plurality of limiting pillars are movably arranged within the plurality of limiting grooves.

10. The electronic device kit according to claim 3, wherein the triggering unit comprises a plurality of triggering units, the first clamping unit comprises a plurality of first abutting surfaces, and the second clamping unit comprises a plurality of second abutting surfaces; and the plurality of triggering units are all movably arranged within the installation base, and the first triggering part of each triggering unit corresponds one-to-one with the first abutting surface of each first clamping unit, and the second triggering part of each triggering unit corresponds one-to-one with the second abutting surface of each second clamping unit.

11. The electronic device kit according to claim 10, further comprising:

an elastic body, with the elastic body positioned between the relatively arranged-two relatively arranged triggering units of the plurality of triggering units, or the elastic body positioned between a triggering unit of the plurality of triggering units and the installation base.

12. The electronic device kit according to claim 1, wherein the installation base comprises a first end and a second end arranged opposite to each other, with a least a portion of the first clamping unit and the second clamping unit extending from the second end; and the second end is equipped with a locating pillar and/or an electronic probe, with the electronic probe capable of contacting an electronic contact of the shell component for circuit connection.

13. The electronic device kit according to claim 1, wherein a protruding end of the first clamping unit from the installation base comprises a first clamping part, and a protruding end of the second clamping unit from the installation base comprises a second clamping part;

an outer wall of the shell component is provided with at least one a first mounting hole and a second mounting hole; and the first clamping part is engaged in the first mounting hole, and the second clamping part is engaged in the second mounting hole to secure the disassembly and assembly component to the shell component.

14. The electronic device kit according to claim 13, wherein the installation base includes a first end and a second end arranged opposite to each other, with at least a portion of the first clamping unit and the second clamping unit extending from the second end;

the second end is equipped with a plurality of locating pillars; and the shell component is provided with a plurality of locating holes for installing the locating pillars.

15. The electronic device kit according to claim 14, wherein one of the plurality of locating holes is communicatively connected to the first mounting hole, and another one of the plurality of locating holes is communicatively connected to the second mounting hole.

* * * * *